US010895090B2

(12) United States Patent
Worm et al.

(10) Patent No.: US 10,895,090 B2
(45) Date of Patent: Jan. 19, 2021

(54) ANCHORING UMBRELLA STAND WITH MANUALLY EXTENDABLE DRILL BIT

(71) Applicant: Joseph Weston Capital Management, LLC, Chapel Hill, NC (US)

(72) Inventors: Steven Lee Worm, Raleigh, NC (US); William Bryan Carr, Apex, NC (US); Ryan Joseph Hilton, Chapel Hill, NC (US); Curry Weston Hilton, Chapel Hill, NC (US)

(73) Assignee: JOSEPH WESTON CAPITAL MANAGEMENT, LLC, Chapel Hill, NC (US)

( * ) Notice: Subject to any disclaimer, the term of this patent is extended or adjusted under 35 U.S.C. 154(b) by 171 days.

(21) Appl. No.: 16/175,198

(22) Filed: Oct. 30, 2018

(65) Prior Publication Data

US 2020/0131795 A1   Apr. 30, 2020

(51) Int. Cl.
*E04H 12/22*   (2006.01)
*A45B 23/00*   (2006.01)
(Continued)

(52) U.S. Cl.
CPC .......... *E04H 12/2223* (2013.01); *A45B 23/00* (2013.01); *A45B 2023/0012* (2013.01);
(Continued)

(58) Field of Classification Search
CPC .......... E04H 12/2223; A45B 2025/003; A45B 2200/1009; E04D 5/801
See application file for complete search history.

(56) References Cited

U.S. PATENT DOCUMENTS

| 501,811 A | 7/1893 | Stombaugh |
| 1,284,569 A | 11/1918 | Bikowski |

(Continued)

FOREIGN PATENT DOCUMENTS

| CA | 2084563 A1 | 6/1993 |
| CN | 106974385 A | 7/2017 |

(Continued)

OTHER PUBLICATIONS

Author Unknown, "Beach umbrella sand anchor," eurekaweb.fr/wp/beach-umbrella-sand-anchor-es/, accessed on Mar. 21, 2018, EurekaWEB, 5 pages.
(Continued)

*Primary Examiner* — David R Dunn
*Assistant Examiner* — Danielle Jackson
(74) *Attorney, Agent, or Firm* — Withrow & Terranova, P.L.L.C.

(57) ABSTRACT

Disclosed is an anchoring umbrella stand with a manually extendable drill bit. In certain exemplary embodiments disclosed herein, the anchoring umbrella stand includes a drill bit that can be manually extendable from and manually retractable into an elongate housing body by use of a crank handle. Manual operation of the crank handle rotates and translates the drill bit between a retracted position within the elongate housing body and an extended position outside the elongate housing body. In certain embodiments, the anchoring umbrella stand further includes a gear train assembly and/or a stabilizing plate to further aid a user in anchoring the umbrella stand. The anchoring umbrella stand facilitates umbrella anchoring by providing a more stable anchoring mechanism that requires less strength, less coordination, and no electric power to operate.

24 Claims, 18 Drawing Sheets

(51) Int. Cl.
*A45B 25/00* (2006.01)
*F16H 25/20* (2006.01)

(52) U.S. Cl.
CPC . *A45B 2025/003* (2013.01); *A45B 2200/1009* (2013.01); *F16H 25/20* (2013.01); *F16H 2025/2084* (2013.01)

(56) References Cited

U.S. PATENT DOCUMENTS

| | | | |
|---|---|---|---|
| 2,063,052 | A | 12/1936 | Robins |
| 2,395,033 | A | 2/1946 | Black |
| 2,449,313 | A * | 9/1948 | Naef ................ H01R 4/66 |
| | | | 174/6 |
| 3,318,560 | A * | 5/1967 | Garrette, Jr. .......... E04H 12/182 |
| | | | 248/545 |
| 3,823,785 | A | 7/1974 | Toliver |
| 4,832,304 | A * | 5/1989 | Morgulis ............... A01K 97/10 |
| | | | 135/16 |
| 4,850,564 | A | 7/1989 | Padin |
| 4,920,897 | A * | 5/1990 | Reed .................... A47B 37/04 |
| | | | 108/150 |
| 5,152,495 | A | 10/1992 | Jacinto et al. |
| 5,156,369 | A | 10/1992 | Tizzoni |
| 5,199,361 | A | 4/1993 | Robinson |
| 5,396,916 | A | 3/1995 | Boissonnault |
| 5,553,825 | A * | 9/1996 | Rasmussen ............... B60S 9/04 |
| | | | 248/354.3 |
| 5,662,304 | A | 9/1997 | McDaniel |
| 6,199,569 | B1 * | 3/2001 | Gibson ............... E04H 12/2223 |
| | | | 135/16 |
| 6,210,077 | B1 | 4/2001 | Kondo |
| D456,131 | S | 4/2002 | Dotson, Jr. |
| 6,547,203 | B1 * | 4/2003 | Willard .................. E02D 5/801 |
| | | | 248/530 |
| 6,908,067 | B2 | 6/2005 | Clasen |
| 6,953,180 | B1 | 10/2005 | Ruvalcaba et al. |
| 7,246,783 | B2 | 7/2007 | Harold et al. |
| 7,264,210 | B2 | 9/2007 | Yu |
| 7,438,273 | B2 | 10/2008 | Tota |
| 7,497,225 | B1 | 3/2009 | Klein, Jr. et al. |
| 7,503,541 | B2 | 3/2009 | Harold et al. |
| 7,581,707 | B2 | 9/2009 | Saraf |
| 7,942,377 | B2 | 5/2011 | Harold et al. |
| 8,082,934 | B1 | 12/2011 | Kucinski |
| 8,371,319 | B2 | 2/2013 | Meibos et al. |
| 9,179,745 | B2 | 11/2015 | Berland |
| 9,221,107 | B2 | 12/2015 | Escola Puig-Corve |
| 9,629,427 | B1 | 4/2017 | Alm |
| 2005/0211282 | A1 | 9/2005 | DeVenezia et al. |
| 2008/0092936 | A1 | 4/2008 | Carabillo |
| 2008/0099061 | A1 | 5/2008 | McKnight |
| 2010/0200724 | A1 | 8/2010 | Kukuk |
| 2015/0040491 | A1 | 2/2015 | Frank |
| 2018/0010354 | A1 | 1/2018 | Jecel |

FOREIGN PATENT DOCUMENTS

| | | |
|---|---|---|
| CN | 206949724 U | 2/2018 |
| ES | 2627569 B1 | 1/2018 |

OTHER PUBLICATIONS

Author Unknown, "DrillBeach: An Electric Beach Umbrella That Scews Into the Sand," odditymall.com/drillbeach-electric-beach-umbrella, Jul. 24, 2015, Odditymall, 9 pages.

Author Unknown, "Power Driver," www.aughog.com/products-page/power-driver/, accessed Mar. 23, 2018, Aughog Products, LLC, 5 pages.

* cited by examiner

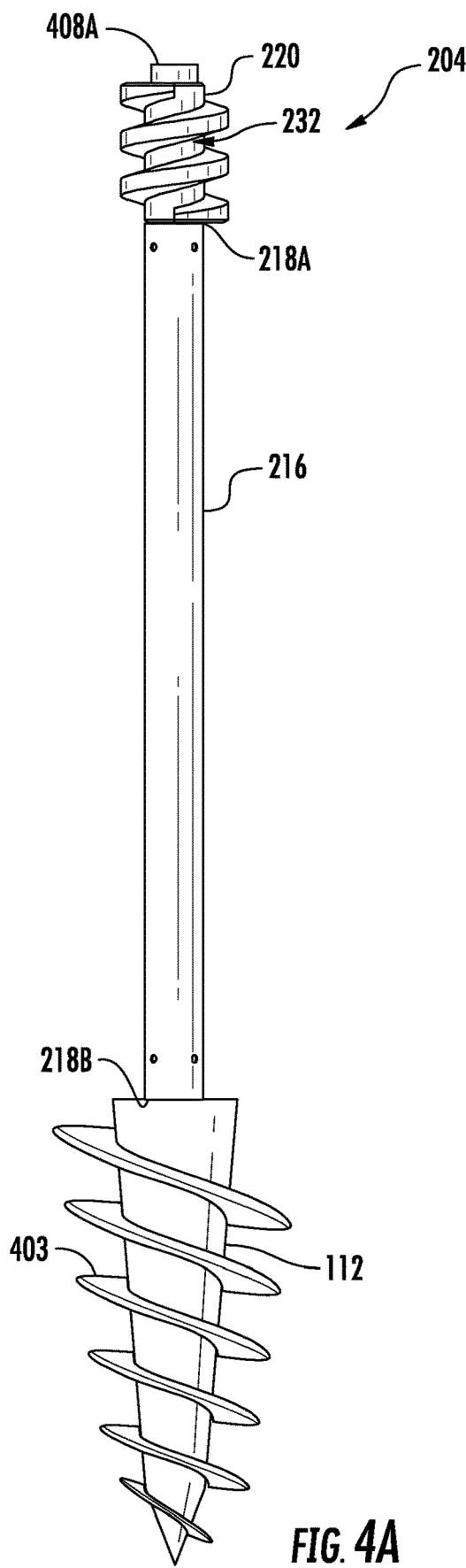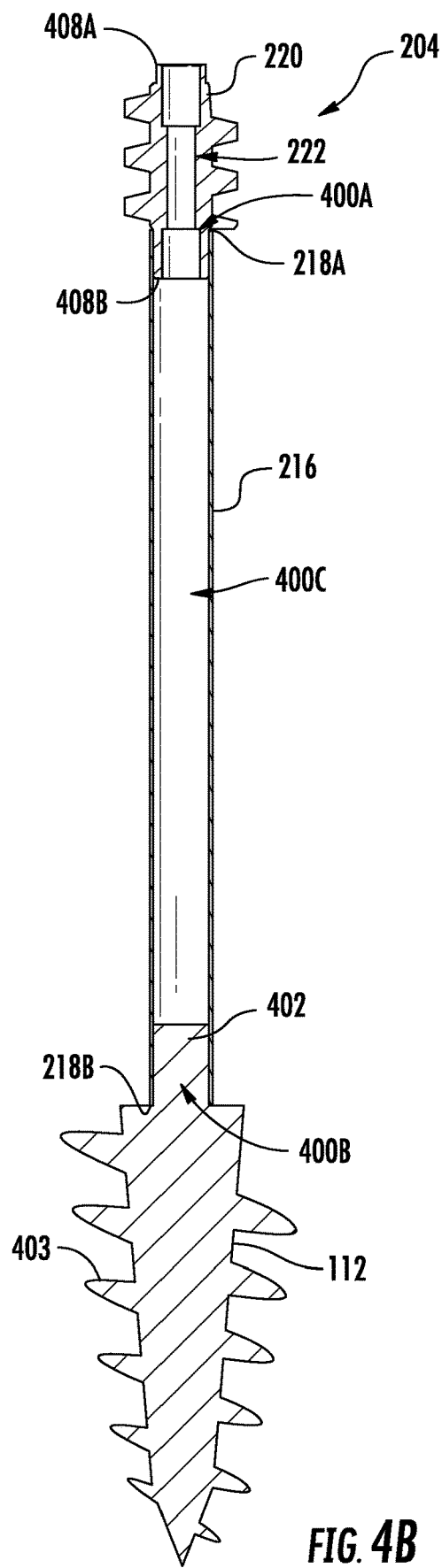

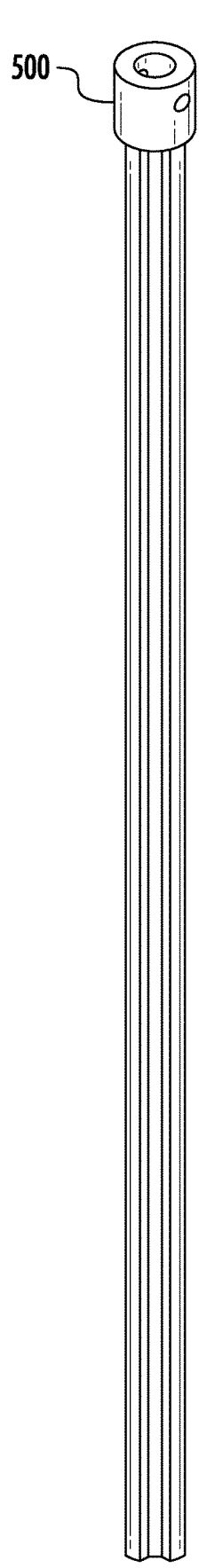
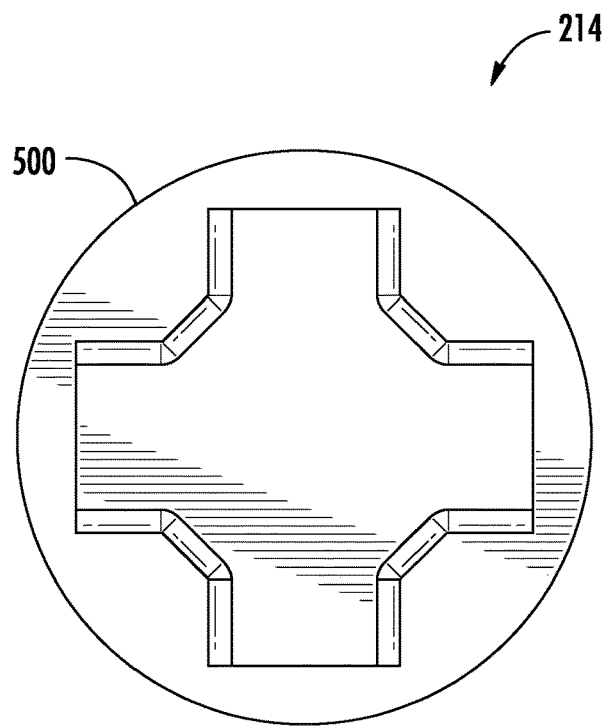
FIG. 5C
FIG. 5B

ANCHORING UMBRELLA STAND WITH MANUALLY EXTENDABLE DRILL BIT

FIELD OF THE DISCLOSURE

The disclosure relates to umbrella stands, and more particularly to an anchoring umbrella stand with a manually extendable drill bit, stabilizing plate, and/or gear train assembly.

BACKGROUND

People often bring beach umbrellas to the beach to provide shade from the sun. Setting up the beach umbrellas requires anchoring a lower post of the beach umbrella in the sand. Often, the only aid in setting up the beach umbrella is a dull point at the end of the lower post of the beach umbrella to penetrate the sand. Inserting such a beach umbrella within the sand requires a user to exert a great deal of downward force and have significant coordination to twist and turn the post to penetrate the lower post sufficient to hold the beach umbrella. Even when the lower post is sufficiently anchored within the sand, the lower post does not usually include any other anchoring geometry or mechanism to retain the lower post within the sand. Accordingly, a stray wind can catch the umbrella and dislodge the lower post from the sand.

Some beach umbrellas include drilling mechanisms and/or retaining features to overcome some of these disadvantages. For example, some umbrellas may include manually operated drill bits at the end of the lower post that rotate (but do not translate) to facilitate penetration and anchoring in the sand. However, such umbrellas still require a great deal of strength and coordination, and maybe even more strength and coordination than a typical umbrella. In particular, a user must still push the lower post downward and orient the lower post generally vertically, but must now also operate a manual mechanism.

Other beach umbrellas include an electrically operated drill bit at an end of the lower post to assist with sand penetration and anchoring therein. However, such umbrellas are disadvantageous as beaches are often inherently remote and electrical power sources are often not available. For those that include batteries, the batteries can quickly run out of power, and even if the batteries are rechargeable, users must remember to recharge the batteries.

What is needed is an anchoring umbrella stand that reduces the strength and/or coordination required for penetrating and anchoring within sand, and/or avoids electrical power for operation.

No admission is made that any reference cited herein constitutes prior art. Applicant expressly reserves the right to challenge the accuracy and pertinency of any cited documents.

SUMMARY

Disclosed is an anchoring umbrella stand with a manually extendable drill bit. In certain exemplary embodiments disclosed herein, the anchoring umbrella stand includes a drill bit that can be manually extendable from and manually retractable into an elongate housing body by use of a crank handle. Manual operation of the crank handle rotates and translates the drill bit between a retracted position within the elongate housing body and an extended position outside the elongate housing body. In certain embodiments, the anchoring umbrella stand further includes a gear train assembly and/or a stabilizing plate to further aid a user in anchoring the umbrella stand. The anchoring umbrella stand facilitates umbrella anchoring by providing a more stable anchoring mechanism that requires less strength, less coordination, and no electric power to operate.

One embodiment is directed to an anchoring umbrella stand including an elongate housing body, an umbrella mount, a crank handle, and a drill bit. The umbrella mount is attached to the elongate housing body proximate a top end of the elongate housing body. The crank handle is attached to the elongate housing body proximate the top end of the elongate housing body. The crank handle is rotatable relative to the elongate housing body. The drill bit is mechanically coupled to the crank handle and translatable relative to the elongate housing body between a retracted position within the elongate housing body to an extended position outside the elongate housing body proximate a bottom of the elongate housing body. Manual operation of the crank handle rotates and translates the drill bit between the retracted position and the extended position.

A further embodiment includes an anchoring umbrella stand, including a housing assembly, a gearbox assembly, and a drill assembly. The housing assembly includes an elongate housing body, a threaded sleeve, a bearing assembly, and a stabilizing plate. The elongate housing body extends along a first axis. The threaded sleeve is positioned within the elongate housing body. The bearing assembly is positioned within the elongate housing body. The stabilizing plate is attached to the elongate housing body proximate a bottom of the elongate housing body. The stabilizing plate includes a plurality of ribs radially extending at a bottom surface of the stabilizing plate. The gearbox assembly is attached to a top end of the elongate housing body. The gearbox assembly includes a gearbox housing, an umbrella mount, a crank handle, a gear train assembly, and a driving shaft. The umbrella mount is attached to a top of the gearbox housing. The crank handle is rotatably attached to the gearbox housing. An axis of rotation of the crank handle is perpendicular to the first axis of the elongate housing body. The crank handle is rotatable relative to the elongate housing body. The gear train assembly is at least partially positioned within the gearbox housing. The gear train assembly includes an input shaft attached to the crank handle, an input gear attached to the input shaft, an output gear mechanically coupled to the input gear, and an output shaft attached to the output gear. The driving shaft is attached to the output shaft and has a non-circular cross-section. The drill assembly is mechanically coupled to the gearbox assembly and at least partially positioned within the elongate housing body. The drill assembly includes a hollow drill shaft, a threaded lead screw, and a drill bit. The hollow drill shaft has a top end and a bottom end. At least a portion of the hollow drill shaft of the drill assembly is positioned within and extending through the bearing assembly. The threaded lead screw is attached to the top end of the drill shaft and positioned within the elongate housing body. The threaded lead screw is mechanically coupled to the threaded sleeve of the housing assembly. The threaded lead screw defines a channel with a non-circular cross-section. At least a portion of the driving shaft is positioned within the channel of the threaded lead screw. The drill bit is attached to the bottom end of the drill shaft. The drill bit is mechanically coupled to the crank handle and translatable relative to the elongate housing body between a retracted position within the elongate housing body to an extended position outside the elongate housing body proximate a bottom of the elongate housing body. Manual operation of the crank handle rotates the driving shaft via the gear train assembly, which rotates and translates the lead screw relative to the threaded sleeve, which rotates and translates the drill bit between the retracted position and the extended position.

A further embodiment includes a method of anchoring an umbrella. The method includes standing on a stabilizing plate of an anchoring umbrella stand, a drill bit of the anchoring umbrella stand in a retracted position within an elongate housing body of the anchoring umbrella stand. The method further includes manually operating a crank handle of the anchoring umbrella stand to rotate and translate the drill bit to an extended position outside the elongate housing body and within the ground.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 4A is a side view of the drill assembly of the anchoring umbrella stand of FIGS. 2A-2C, the drill assembly including a hollow drill shaft, a threaded lead screw, and a drill bit;

FIG. 4B is a cross-sectional side view of the hollow drill shaft of the drill assembly of FIG. 4A;

FIG. 5B is a perspective view of the driving shaft of the gearbox assembly of FIG. 5A;

FIG. 5C is a bottom view of the driving shaft of FIG. 5B;

DETAILED DESCRIPTION

Figure 1:
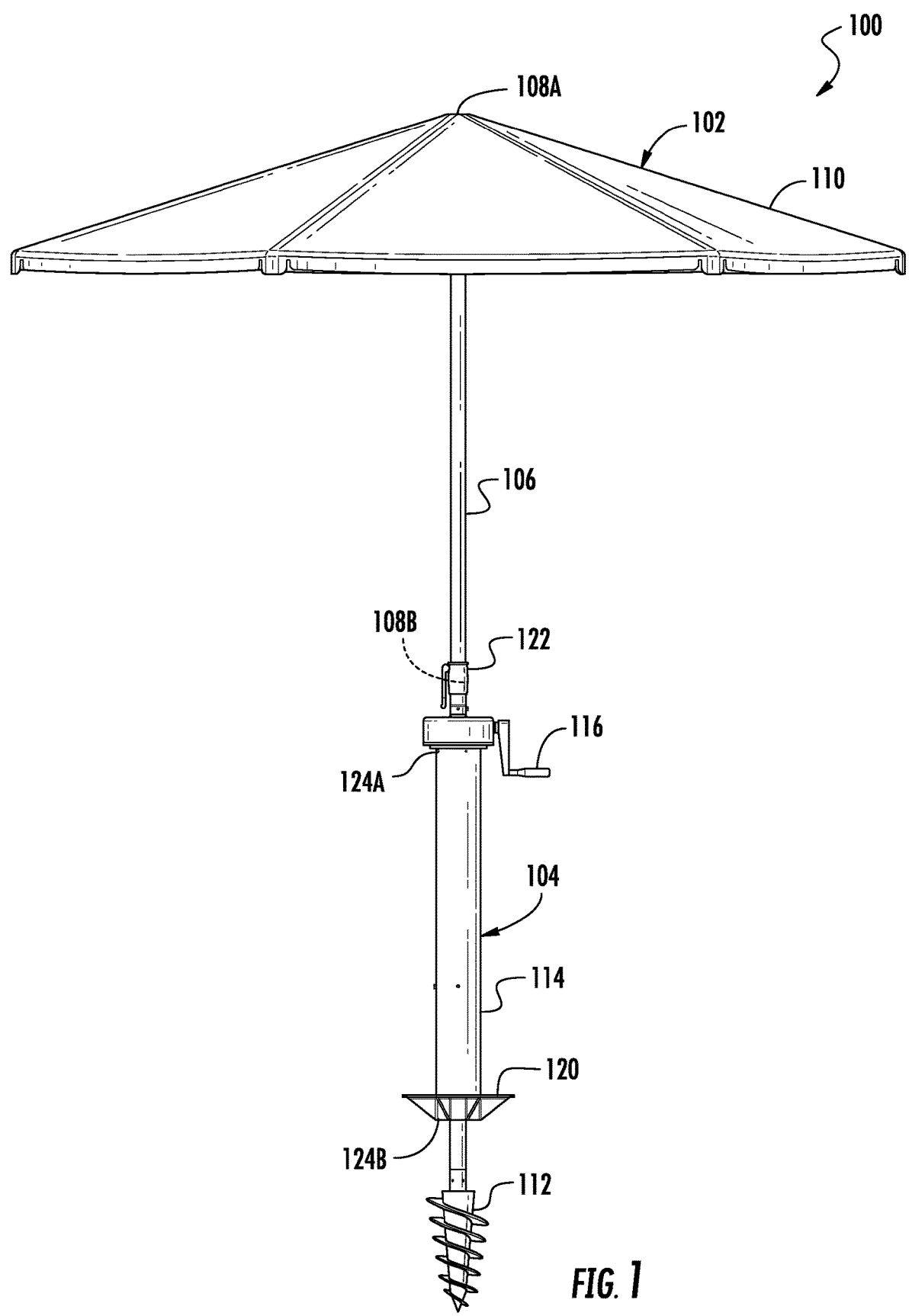
FIG. 1 is a side view of an umbrella assembly including an umbrella and an anchoring umbrella stand.

Reference will now be made in detail to the present preferred embodiments, examples of which are illustrated in the accompanying drawings. Whenever possible, the same reference numerals will be used throughout the drawings to refer to the same or like parts.

Terms such as "left," "right," "top," "bottom," "front," "back," "horizontal," "parallel," "perpendicular," "vertical," "lateral," and similar terms are used for convenience of describing the attached figures and are not intended to limit this description. For example, terms such as "left side" and "right side" are used with specific reference to the drawings as illustrated and the embodiments may be in other orientations in use. Further, as used herein, terms such as "horizontal," "parallel," "perpendicular," "vertical," "lateral," etc., include slight variations that may be present in working examples.

Disclosed is an anchoring umbrella stand with a manually extendable drill bit. In certain exemplary embodiments disclosed herein, the anchoring umbrella stand includes a drill bit that can be manually extendable from and manually retractable into an elongate housing body by use of a crank handle. Manual operation of the crank handle rotates and translates the drill bit between a retracted position within the elongate housing body and an extended position outside the elongate housing body, such that electricity or batteries are not required. In certain embodiments, the anchoring umbrella stand further includes a gear train assembly and/or a stabilizing plate to further aid a user in anchoring the umbrella stand. The anchoring umbrella stand facilitates umbrella anchoring by providing a more stable anchoring mechanism that requires less strength, less coordination, and no electric power to operate.

In this regard, FIG. 1 is a side view of an umbrella assembly 100 including a drill bit that can be manually extendable from and manually retractable into an elongate housing body by use of a crank handle. The umbrella assembly 100 includes an umbrella 102 and an anchoring umbrella stand 104. The umbrella 102 includes a pole 106 having a top end 108A (may also be referred to as top, first end, etc.) and a bottom end 108B (may also be referred to as bottom, second end, etc.), and a canopy 110 attached at the top end 108A of the pole 106. The bottom end 108B of the pole 106 is removably attachable to the anchoring umbrella stand 104.

The anchoring umbrella stand 104 includes a manually extendable drill bit 112. In particular, the drill bit 112 that can be manually extendable from and manually retractable into an elongate housing body 114 of the anchoring umbrella stand 104 by use of a crank handle 116. Manual operation of the crank handle 116 rotates and translates the drill bit 112 between a retracted position (e.g., first position) within the elongate housing body 114 and an extended position (e.g., second position) outside the elongate housing body 114. Rotation and translation of the drill bit 112 aids ground penetration as a user does not need to push downward with their arms or manually twist an umbrella post with their hands, which can require a great deal of strength and coordination. Instead, a user merely has to operate a crank handle 116, which provides the translation and rotation. Manual operation to achieve such rotation and translation of the drill bit 112 does not require electric power, thereby avoiding any inconvenience associated with electric power. The anchoring umbrella stand 104 facilitates umbrella 102 anchoring by providing a more stable anchoring mechanism that requires less strength, less coordination, and no electric power to operate. In certain embodiments, the anchoring umbrella stand 104 further includes a gear train assembly 118 (see FIG. 2B) and/or a stabilizing plate 120 to further aid a user in anchoring the umbrella stand 104. In particular, the gear train assembly 118 aids in ground penetration and provides a gear ratio to require less strength from a user for operation. The stabilizing plate 120 provides greater stability during and after operation of the umbrella stand 104, such as by providing a platform for a user to stand on and provide a counterforce to translation of the drill bit 112 into the ground.

The anchoring umbrella stand 104 includes an elongate housing body 114, an umbrella mount 122, a crank handle 116, and a drill bit 112. The umbrella mount 122 is attached to the elongate housing body 114 proximate a top end 124A of the elongate housing body 114. The crank handle 116 is attached to the elongate housing body 114 proximate the top end 124A of the elongate housing body 114. The crank handle 116 is rotatable relative to the elongate housing body 114. The drill bit 112 is mechanically coupled to the crank handle 116 and translatable relative to the elongate housing body 114 between a retracted position within the elongate housing body 114 to an extended position outside the elongate housing body 114 proximate a bottom 124B of the elongate housing body 114. Manual operation of the crank handle 116 rotates and translates the drill bit 112 between the retracted position and the extended position. As noted above, rotation and translation of the drill bit 112 aids ground penetration. Manual operation to achieve such rotation and translation of the drill bit 112 does not require electric power, thereby avoiding any inconvenience associated with electric power.

Figure 2A:
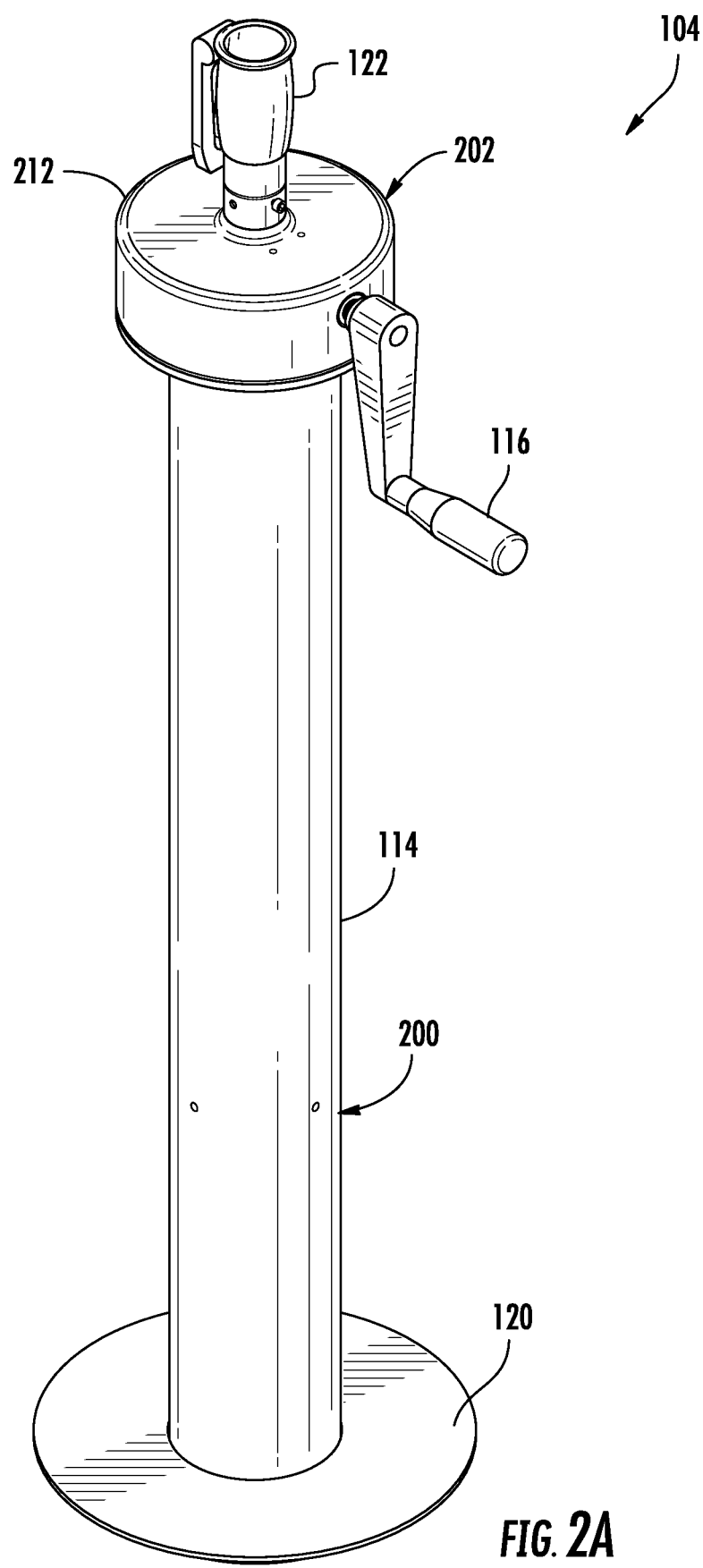
FIG. 2A is a perspective of the anchoring umbrella stand of FIG. 1.
Figure 2B:
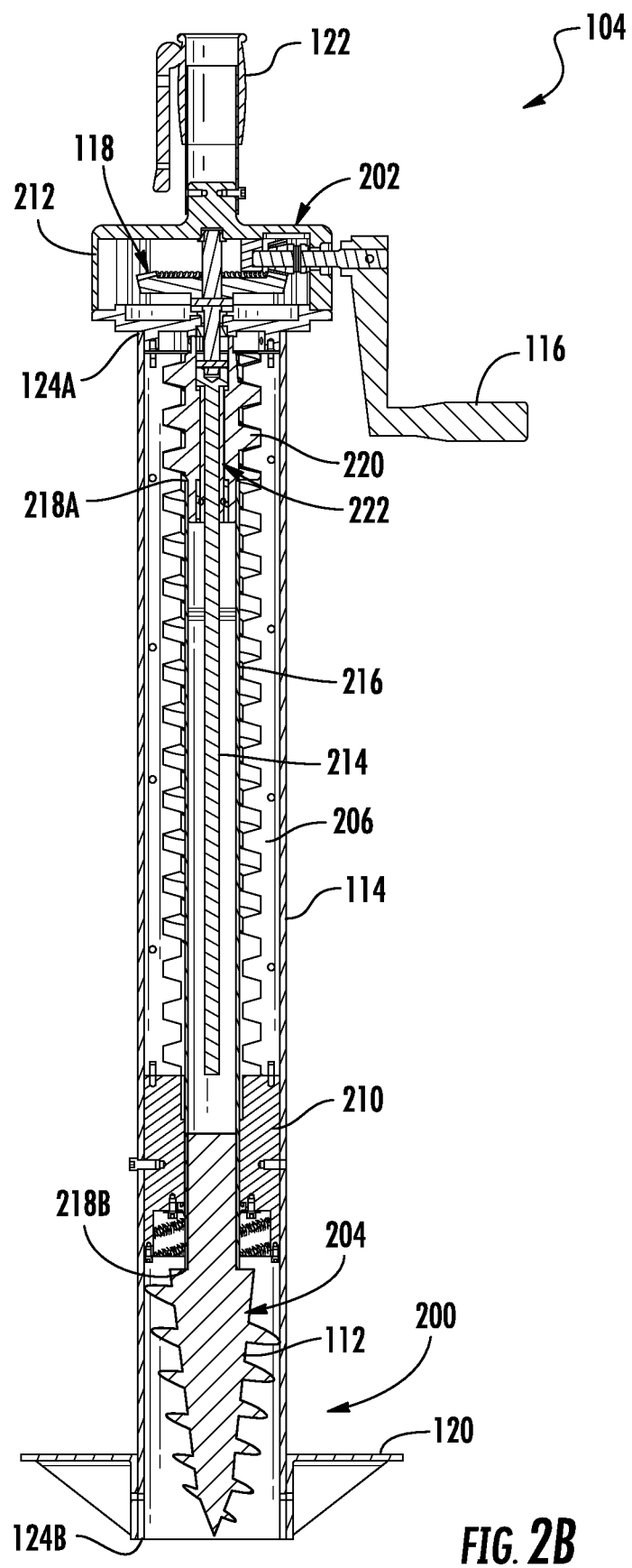
FIG. 2B is a cross-sectional side view of the anchoring umbrella stand of FIG. 2A.
Figure 2C:
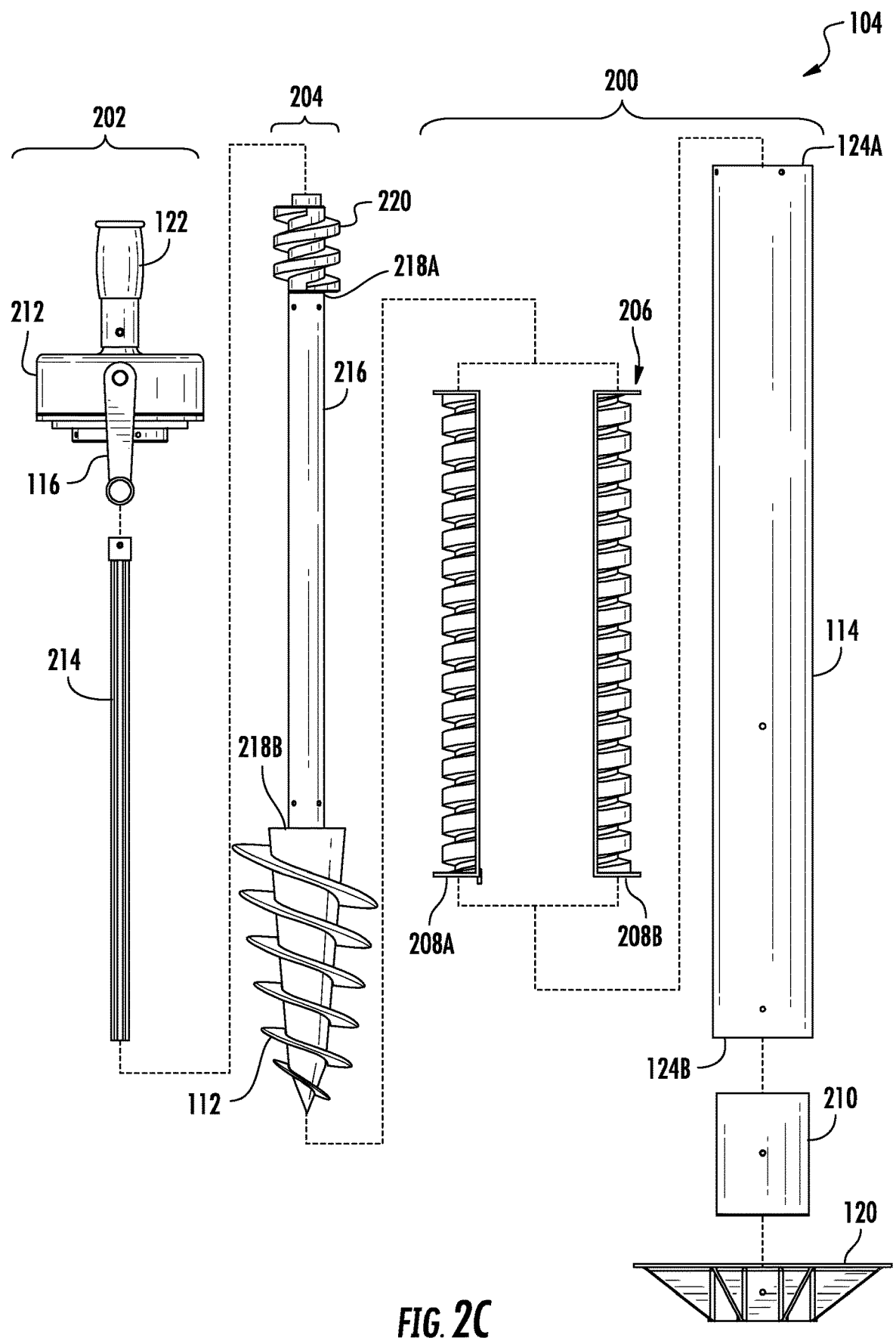
FIG. 2C is an exploded side view of the anchoring umbrella stand of FIG. 2A, the anchoring umbrella stand including a drill assembly, a housing assembly, and a gearbox assembly.

To further explain the anchoring umbrella stand 104 of FIG. 1 and certain features therein, FIGS. 2A-2C are additional views of the anchoring umbrella stand 104 of FIG. 1 introducing various components that provide the functionality and benefits mentioned above, and which are discussed in more detail below In particular, FIG. 2A is a perspective view of the anchoring umbrella stand 104 of FIG. 1, FIG. 2B is a cross-sectional side view of the anchoring umbrella stand 104 of FIG. 2A, and FIG. 2C is an exploded side view of the anchoring umbrella stand 104 of FIG. 2A. The anchoring umbrella stand 104 includes a housing assembly 200, gearbox assembly 202, and a drill assembly 204.

The housing assembly 200 includes an elongate housing body 114 having a top end 124A (may also be referred to as a top, first end, etc.) and a bottom end 124B (may also be referred to as a bottom, second end, etc.), a threaded sleeve 206 (including a first sleeve portion 208A and a second sleeve portion 208B) within the elongate housing body 114 to rotate and translate the drill bit 112 of the drill assembly 204, and a bearing assembly 210 positioned within the elongate housing body 114 to guide the drill assembly 204 and prevent external material from entering the threaded sleeve 206. The threaded sleeve 206 is positioned proximate the top end 124A of the elongate housing body 114 and the bearing assembly 210 positioned proximate the bottom 124B of the elongate housing body 114. The housing assembly 200 further includes a stabilizing plate 120 attached proximate the bottom 124B of the elongate housing body 114 to provide stability for a user. In particular, when placed on the ground, the stabilizing plate 120 orients (and maintains orientation of) the anchoring umbrella stand 104 vertically. Further, the user can stand on the stabilizing plate 120 to provide downward force while operating (i.e., manually rotating) the crank handle 116.

The gearbox assembly 202 is attached to a top end 124A of the elongate housing body 114. The gearbox assembly 202 further includes a gearbox housing 212 containing a gear train assembly 118 therein. The gear train assembly 118 provides a gear ratio to reduce the amount of force required from the user to operate the anchoring umbrella stand 104 and penetrate the sand (or other ground material). The gearbox assembly 202 further includes a crank handle 116 attached to the gearbox housing 212 and rotatable relative to the elongate housing body 114. The crank handle 116 is mechanically coupled to an input of the gear train assembly 118, and a driving shaft 214 is coupled to an output of the gear train assembly 118. The driving shaft 214 has a non-circular cross-section to engage and rotate the drill assembly 204 while also allowing relative translation therebetween. The gearbox assembly 202 includes an umbrella mount 122 attached to a top of the gearbox housing 212 to attach to the pole 106 of the umbrella 102 (see FIG. 1).

The drill assembly 204 is mechanically coupled to the gearbox assembly 202 and at least partially positioned within the elongate housing body 114 of the housing assembly 200. The drill assembly 204 includes a hollow drill shaft 216 having a top end 218A (may also be referred to as a top, first end, etc.) and a bottom end 218B (may also be referred to as a bottom, second end, etc.), a threaded lead screw 220 attached to the top end 218A of the hollow drill shaft 216, and a drill bit 112 attached to the bottom 218B of the hollow drill shaft 216. At least a portion of the hollow drill shaft 216 is positioned within and extending through the bearing assembly 210. The threaded lead screw 220 is positioned within and mechanically coupled to the threaded sleeve 206 in the elongate housing body 114 of the housing assembly 200. The threaded lead screw 220 defines a channel 222 with a non-circular cross-section that corresponds to the non-circular cross-section of the driving shaft 214. At least a portion of the driving shaft 214 is positioned within the channel 222 of the lead screw 220. The drill bit 112 is attached to the bottom end 218B of the hollow drill shaft 216.

The drill bit 112 is mechanically coupled to the crank handle 116 and translatable relative to the elongate housing body 114 between a retracted position (e.g., first position) within the elongate housing body 114 to an extended position (e.g., second position) outside the elongate housing body 114 proximate the bottom end 124B of the elongate housing body 114. Manual operation of the crank handle 116 rotates the driving shaft 214 via the gear train assembly 118, which rotates and translates the lead screw 220 relative to the threaded sleeve 206, which rotates and translates the drill bit 112 between the retracted position and the extended position.

Figure 3A:
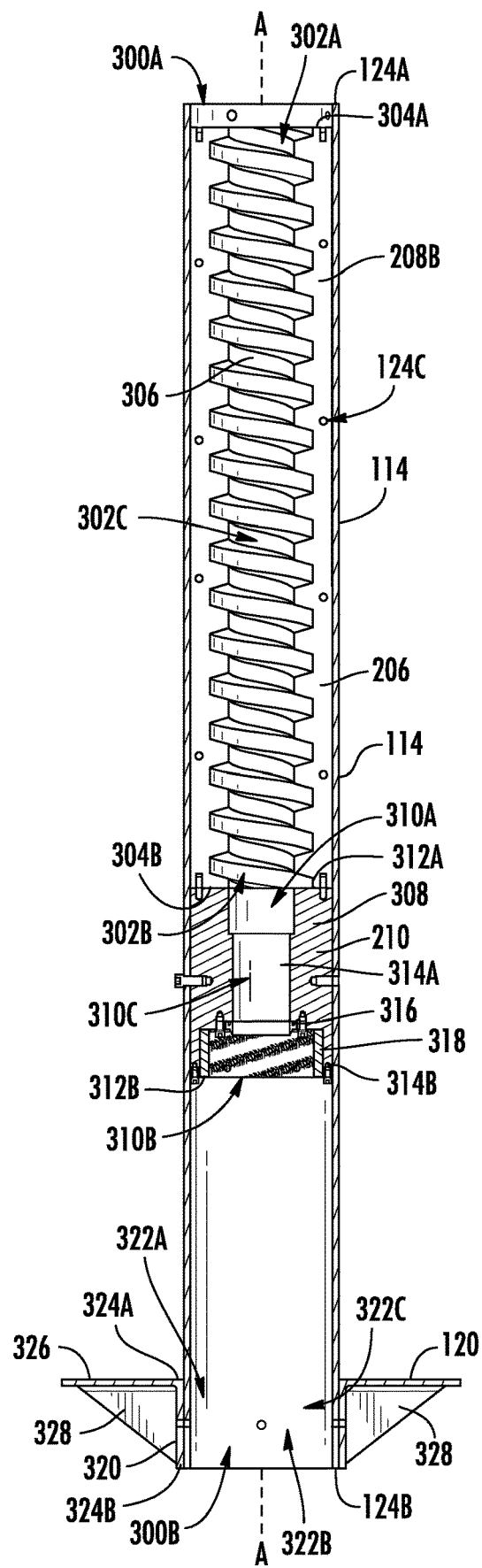
FIG. 3A is a cross-sectional side view of the housing assembly of the anchoring umbrella stand of FIGS. 2A-2C, the housing assembly including an elongate housing body, a threaded sleeve, a bearing assembly, and a stabilizing plate.
Figure 3B:
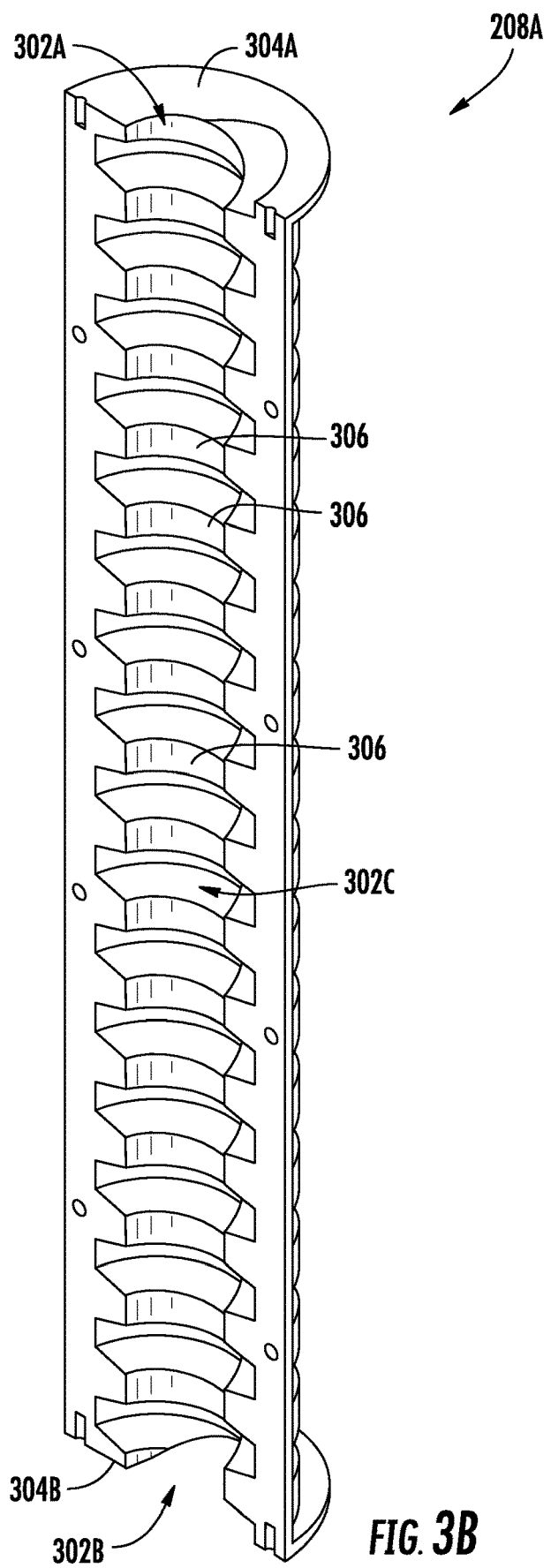
FIG. 3B is a perspective view of the threaded sleeve of the housing assembly of FIG. 3A.
Figure 3C:
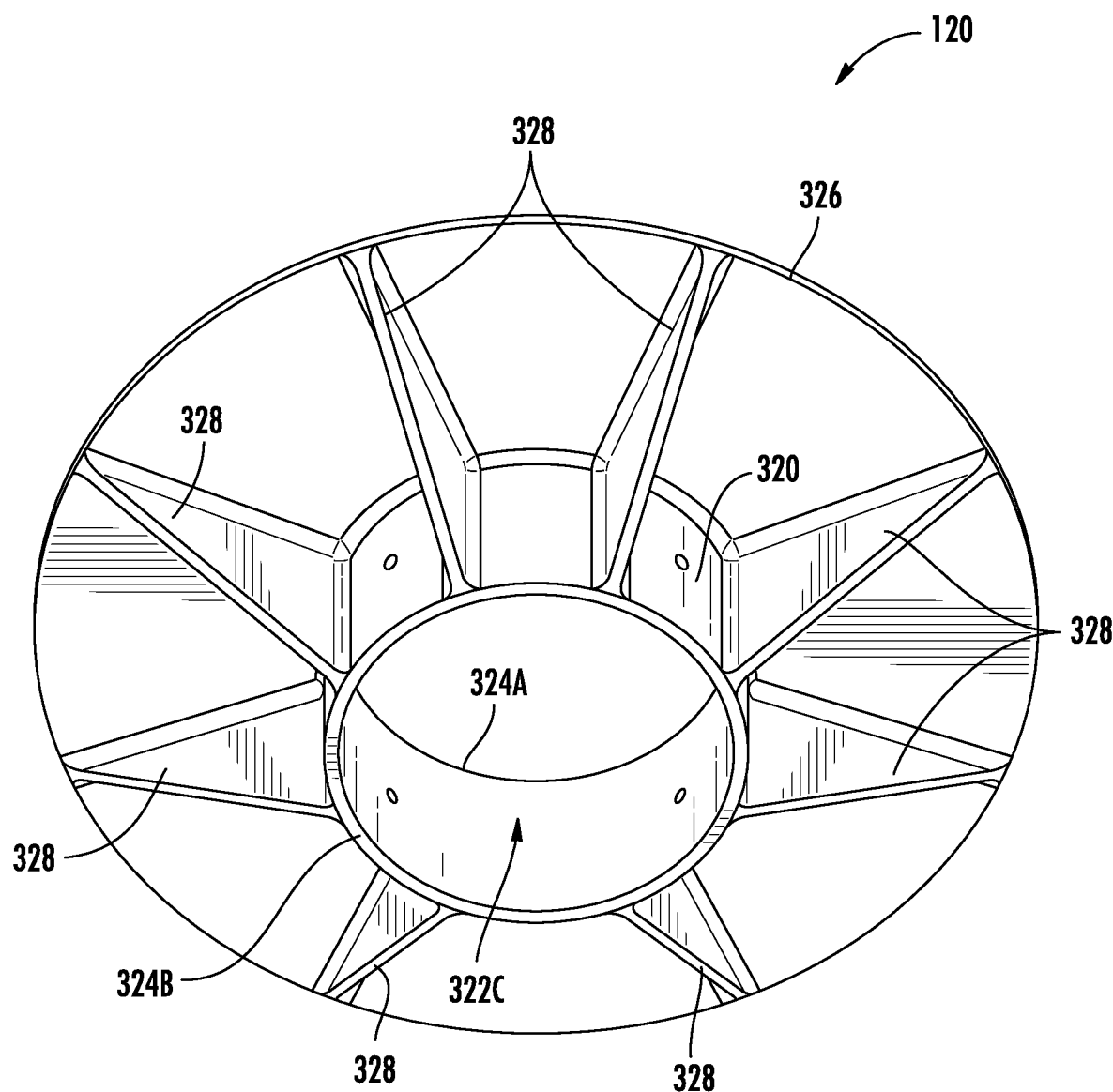
FIG. 3C is a bottom perspective view of the stabilizing plate of the housing assembly of FIG. 3A.

FIGS. 3A-3C are views of the housing assembly 200 of the anchoring umbrella stand 104 of FIGS. 2A-2C to further explain features thereof. FIG. 3A is a cross-sectional side view of the housing assembly 200 of the anchoring umbrella stand 104 of FIGS. 2A-2C. As noted above, the housing assembly 200 includes an elongate housing body 114 having a top end 124A and a bottom end 124B, a threaded sleeve 206 (including a first sleeve portion 208A and a second sleeve portion 208B), and a bearing assembly 210. The elongate housing body 114 extends along axis A (may also be referred to as a first axis, etc.). The elongate housing body 114 defines a top opening 300A at the top end 124A, a bottom opening 300B at the bottom end 124B, and an interior 124C therebetween.

FIG. 3B is a perspective view of the threaded sleeve 206 of the housing assembly 200 of FIG. 3A. Referring to FIGS. 3A and 3B, the threaded sleeve 206 is positioned within the interior 124C of the elongate housing body 114 proximate the top end 124A. The threaded sleeve 206 defines a top opening 302A at a top end 304A, a bottom opening 302B at a bottom end 304B, and an interior 302C therebetween. The threaded sleeve 206 includes internal threads 306.

The bearing assembly 210 includes a bearing body 308 defining a top opening 310A at a top end 312A, a bottom opening 310B at a bottom end 312B, and an interior 310C therebetween. The interior 310C includes an upper portion 314A and a lower portion 314B, where the inner diameter of the upper portion 314A corresponds to (e.g., is approximately the same size as) the outer diameter of the hollow drill shaft 216. The bearing body 308 is attached to the bottom end 304B of the threaded sleeve 206. In other words, the bearing assembly 210 is positioned between the threaded sleeve 206 and the bottom end 124B of the elongate housing body 114. It is noted that in certain embodiments the bearing assembly 210 is incorporated as part of (e.g., attached to) the lower portion of the threaded sleeve 206. The bearing assembly 210 is offset from the bottom end 124B of the elongate housing body 114 to provide sufficient space for the drill assembly 204 to retract into the elongate housing body 114.

The bearing assembly further includes a lip seal 316 (may also be referred to as a gasket seal) and a brushing seal 318 to remove material from the hollow drill shaft 216 as the drill assembly 204 moves from an extended position to a retracted position, and thereby prevent material from entering the interior of the threaded sleeve 206. In particular, the lip seal 316 is positioned approximately between the upper portion 314A and the lower portion 314B. The lip seal 316 is approximately the same size as the inner diameter of the upper portion 314A. In this way, the lip seal 316 is able to prevent smaller granular material (e.g., small pieces of sand) from entering the interior 302C of the threaded sleeve 206 and interfering in operation of the drill assembly 204. The brushing seal 318 is positioned proximate the bottom end 312B of the bearing body 308 (between the bottom end 312B and the lip seal 316). In certain embodiments, the brushing seal 318 is a helical brush with the bristles extending inwardly and contacting the drill assembly 204. Accordingly, the brushing seal 318 removes larger granular material (e.g., large pieces of sand) from entering the interior 302C of the threaded sleeve 206 and interfering in operation of the drill assembly 204. The brushing seal 318 also prevents wear and tear of the lip seal 316.

FIG. 3C is a bottom perspective view of the stabilizing plate 120 of the housing assembly 200 of FIG. 3A. Referring to FIGS. 3A and 3C, the stabilizing plate 120 includes a collar 320 defining a top opening 322A at a top end 324A, a bottom opening 322B at a bottom end 324B, and a central channel 322C therebetween. The inner diameter of the collar 320 is sized to be positioned over an exterior of the elongate housing body 114. In particular, the bottom end 324B of the collar 320 is aligned with the bottom end 124B of the elongate housing body 114. The collar 320 is fixedly (e.g., rigidly) attached to the elongate housing body 114.

A disc 326 extends outwardly from the top end 324A of the collar 320. The disc 326 provides a platform for a user to stand on to put downward force on the anchoring umbrella stand 104 during the anchoring operation. A plurality of ribs 328 are circumferentially positioned around an exterior of the collar 320. In particular, the ribs 328 extend from an outer periphery of the disc 326 to the bottom end 324B of the collar 320, thereby making a generally triangular shape. When a user stands on the disc 326, the ribs 328 dig into the ground, thereby providing rotational anchoring, such as during the anchoring operation.

Figure 4C:
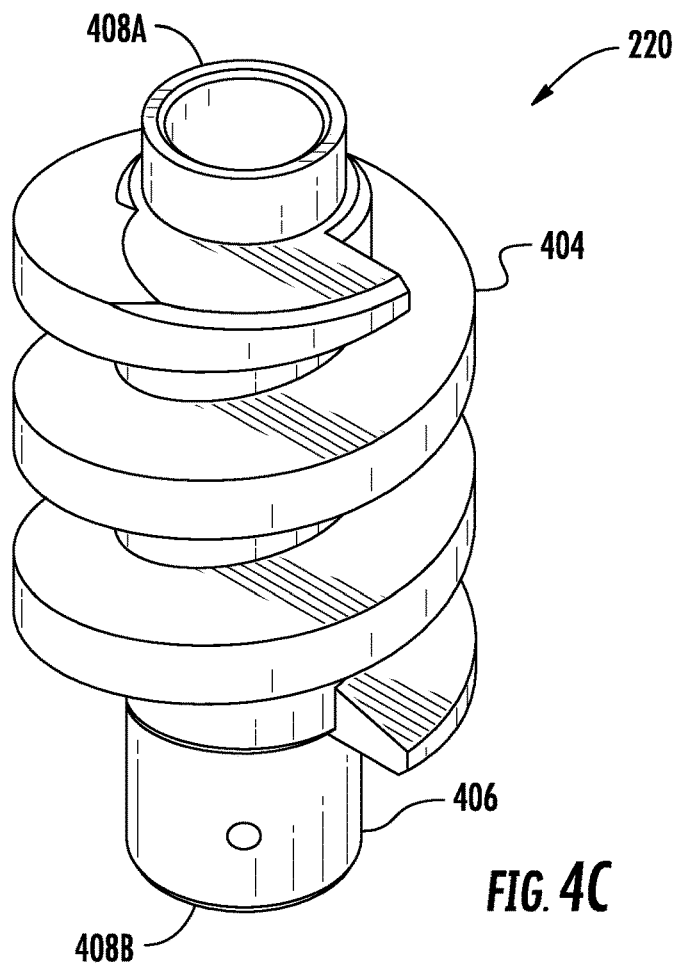
FIG. 4C is a perspective view of the threaded lead screw of the drill assembly of FIG. 4A.
Figure 4D:
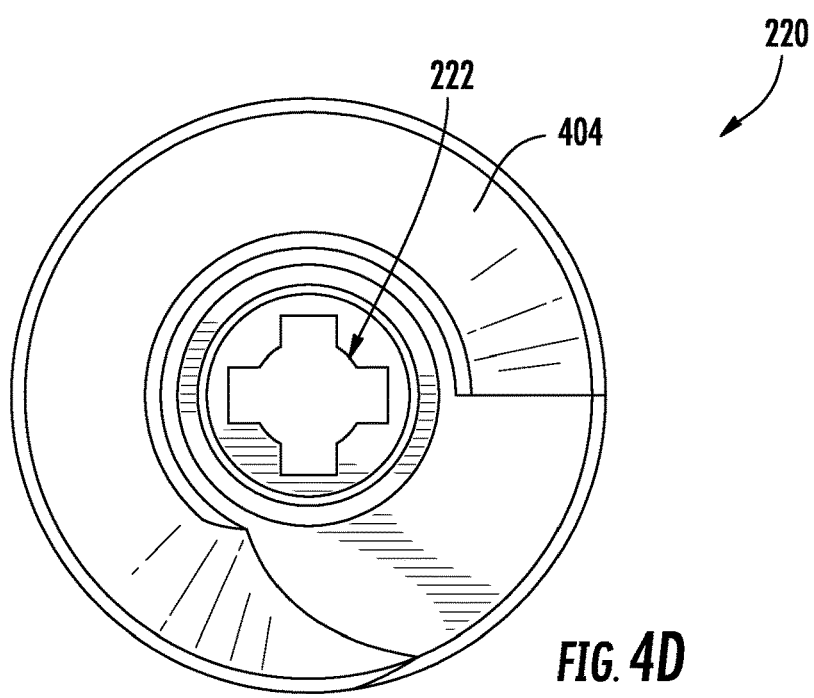
FIG. 4D is a top view of the threaded lead screw of FIG. 4C.

FIGS. 4A-4D are views of the drill assembly 204 of the anchoring umbrella stand of FIGS. 2A-2C to further explain the features thereof. In particular, FIG. 4A is a side view of the drill assembly 204 of the anchoring umbrella stand 104 of FIGS. 2A-2C, FIG. 4B is a cross-sectional side view of the hollow drill shaft 216 of the drill assembly 204 of FIG. 4A, FIG. 4C is a perspective view of the threaded lead screw 220 of the drill assembly 204 of FIG. 4A, and FIG. 4D is a top view of the threaded lead screw 220 of FIG. 4C. The drill assembly 204 is driven by other mechanical features through manual input of the user to rotate and translate the drill assembly 204 from and relative to the housing assembly 200 into the ground.

Referring to FIG. 4A, as noted above, the drill assembly 204 includes a hollow drill shaft 216, a threaded lead screw 220 attached to the top end 218A of the hollow drill shaft 216, and a drill bit 112 attached to the bottom 218B of the hollow drill shaft 216. In particular, the hollow drill shaft 216 defines a top opening 400A at the top end 218A, a bottom opening 400B at the bottom end 218B, and a channel 400C therebetween. The drill bit 112 includes an external thread 403 (e.g., helical screw thread, offset circles, etc.) and a mounting portion 402 (e.g., cylindrical mounting portion) extending from a generally planar top surface of the drill bit 112. The mounting portion 402 is positioned within the bottom opening 400B of the hollow drill shaft 216 and attached thereto, such as by one or more fasteners (e.g., screws). The generally planar top surface helps retain the drill bit 112 within the ground as it provides a large upper surface area. Various types of drill bits 112 could be used. In particular, the drill bit 112 could include an auger, rock bit, etc. In particular, an auger is well-suited for ground penetration and retraction.

Referring to FIG. 4A-4D, the threaded lead screw 220 includes external threads 404 (e.g., helical thread) and a mounting portion 406 (e.g., cylindrical mounting portion) positioned within the top opening 400A of the hollow drill shaft 216 and attached thereto, such as by one or more fasteners (e.g., screws). The external threads 404 of the threaded lead screw 220 are positioned within and have the same pitch as the internal threads 306 of the threaded sleeve 206.

As noted above, the threaded lead screw 220 defines a channel 222 with a non-circular cross-section that corresponds to the non-circular cross-section of the driving shaft 214. The channel 222 extends from a top 408A of the threaded lead screw 220 to a bottom 408B of the threaded lead screw 220. Only a central portion of the channel 222 has a non-circular cross-section; however, in other embodiments the entirety of the channel 222 has a non-circular cross-section. Referring to FIG. 4D, the non-circular cross-section of the channel 222 is generally in the shape of a cross (e.g., similar to the recess of a Phillips head screw head). However, other non-circular cross-sectional shapes could be used (e.g., square, triangular, elliptical, etc.). The non-circular cross-sectional shape ensures that the threaded lead screw 220 (and the drill assembly 204) does not rotate relative to the driving shaft 214.

Figures 5A, 5D:
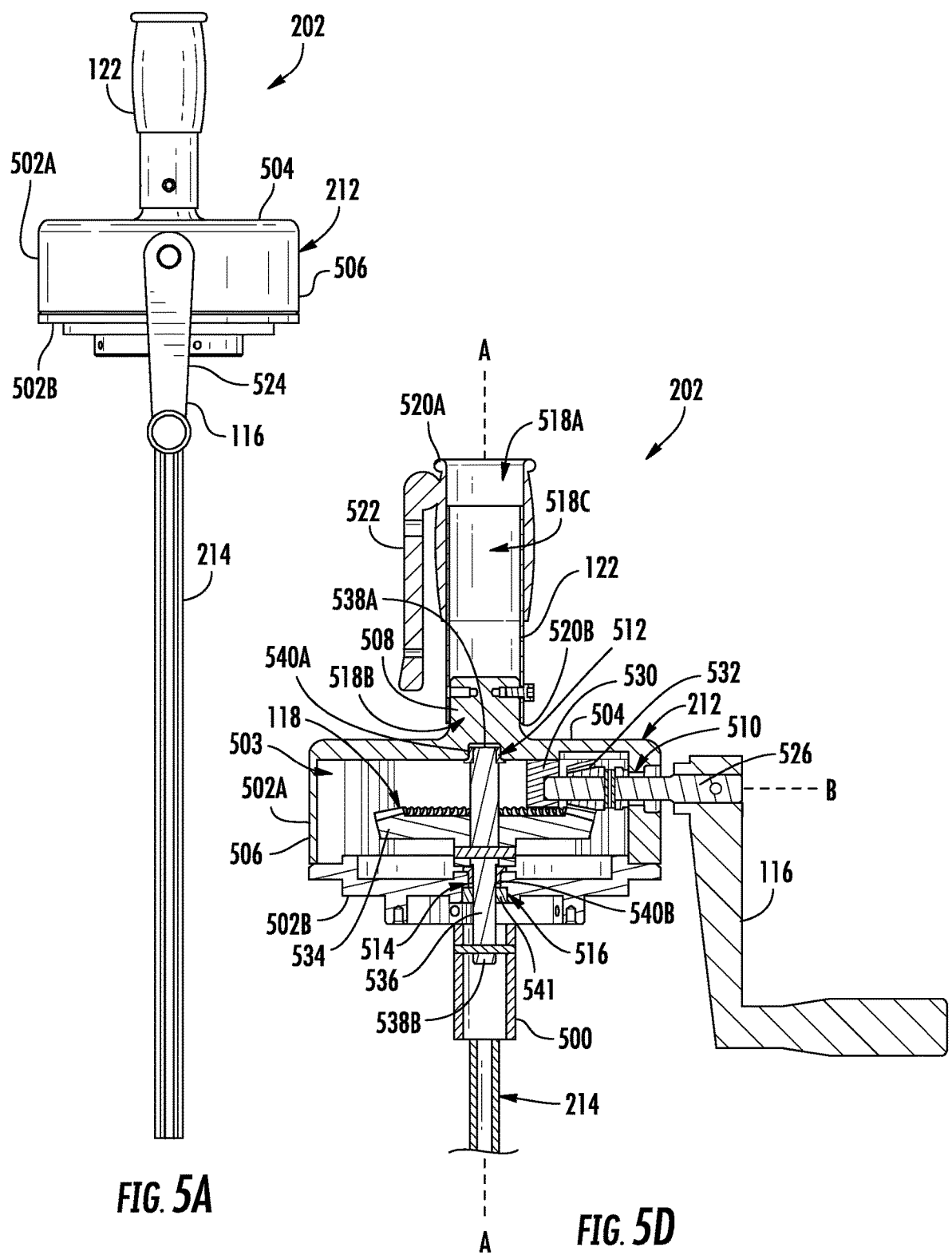
FIG. 5A is a side view of the gearbox assembly of the anchoring umbrella stand of FIGS. 2A-2C, the gearbox assembly including a gearbox housing, an umbrella mount, a crank handle, a gear train assembly, and a driving shaft.
FIG. 5D is a cross-sectional side view of the gearbox assembly of FIG. 5A.
Figure 5E:
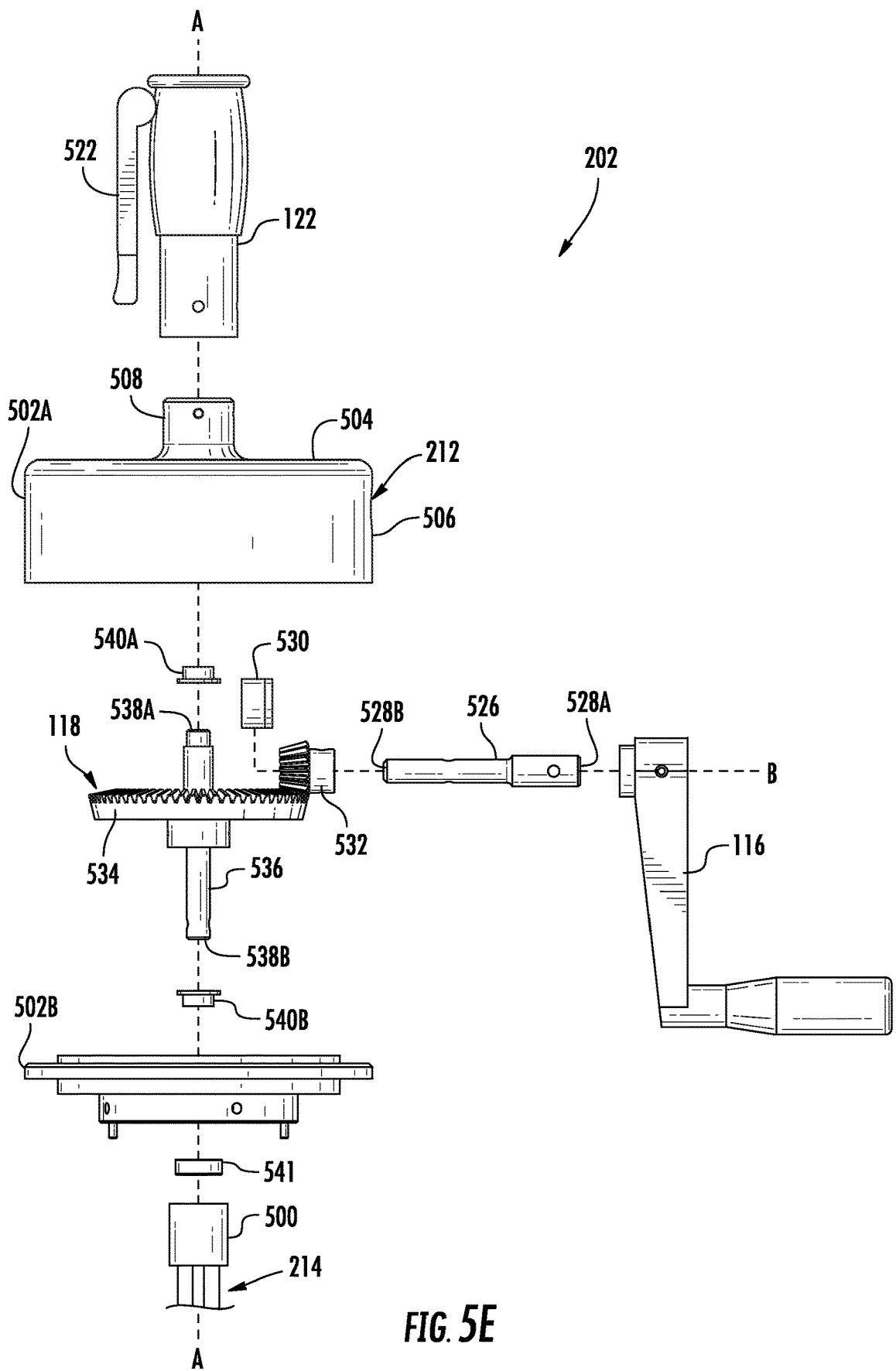
FIG. 5E is an exploded side view of the gearbox assembly of FIG. 5A.

FIGS. 5A-5E are views of the gearbox assembly 202 of the anchoring umbrella stand 104 of FIGS. 2A-2C to further explain features thereof. In particular, FIG. 5A is a side view of the gearbox assembly 202 of the anchoring umbrella stand 104 of FIGS. 2A-2C, FIG. 5B is a perspective view of the driving shaft 214 of the gearbox assembly 202 of FIG. 5A, FIG. 5C is a bottom view of the driving shaft 214 of FIG. 5B, FIG. 5D is a cross-sectional side view of the gearbox assembly 202 of FIG. 5A, and FIG. 5E is an exploded side view of the gearbox assembly 202 of FIG. 5A. The gearbox assembly 202, which is mechanically coupled with the drill assembly 204 and attached to the housing assembly 200, provides a manual input and a gear reduction to reduce the amount of strength and coordination necessary to drive the drill assembly 204 into the ground.

As noted above, the gearbox assembly 202 includes a gearbox housing 212, an umbrella mount 122 attached to a top of the gearbox housing 212, a crank handle 116, a gear train assembly 118, and a driving shaft 214.

Referring to FIGS. 5A-5C, the driving shaft 214 includes a non-circular cross-section that corresponds in size and shape to the non-circular cross-section of the channel 222 of the threaded lead screw 220 of the drill assembly 204. The non-circular cross-section of the driving shaft 214 is generally in the shape of a cross (e.g., similar to the recess of a Phillips head screw head). However, other non-circular cross-sectional shapes could be used (e.g., square, triangular, elliptical, etc.). The non-circular cross-sectional shape ensures that the threaded lead screw 220 (and the drill assembly 204) does not rotate relative to the driving shaft 214. The driving shaft 214 includes a collar 500 at a top of the driving shaft 214 for attaching the driving shaft 214 to the gear train assembly 118.

Referring to FIGS. 5A and 5C-5D, the gearbox housing 212 includes an upper housing 502A (may also be referred to as a cover) and a lower housing 502B (may also be referred to as a base plate) attached to one another and together defining an interior 503. The upper housing 502A includes a top wall 504 and a sidewall 506 extending from a perimeter of the top wall 504. The top wall 504 includes a central cylinder 508 extending from a center of an exterior of the top wall 504. The central cylinder 508 provides a point of attachment for the umbrella mount 122. The sidewall 506 defines a hole 510 for rotatably mounting the crank handle 116. The top wall 504 further includes a center recess 512 defined in a center of an interior of the top wall 504. The center recess 512 provides a point of attachment for the gear train assembly 118.

The lower housing 502B includes a center through hole 514 and a center recess 516. The center through hole 514 and center recess 516 provide a point of attachment for the gear train assembly 118.

The umbrella mount 122 defines a top opening 518A at a top end 520A, a bottom opening 518B at a bottom end 520B, and a channel 518C therebetween. The bottom opening 518B receives at least a portion of the central cylinder 508 therein. Accordingly, the central cylinder 508 provides stability and maintains the umbrella mount 122 in a generally vertical orientation. The top opening 518A and channel 518C are configured to receive at least a portion of the bottom end 108B of the pole 106 of the umbrella 102 (see FIG. 1). The umbrella mount 122 further includes a locking mechanism 522 to selectively lock the umbrella 102 within the umbrella mount 122. In this way, the umbrella 102 can be removably mounted to the umbrella mount 122.

Referring to FIGS. 5D and 5E, the crank handle 116 is mechanically coupled to the gear train assembly 118. The gear train assembly 118 includes an input shaft 526 having a first end 528A and a second end 528B (opposite the first end 528A). The crank handle 116 is fixedly (e.g., non-rotatably) attached to the first end 528A of the input shaft 526. The input shaft 526 is positioned within the hole 510 of the sidewall 506 and extends through the sidewall 506. In other words, the input shaft 526 extends from the exterior to the interior of the gearbox housing 212. The gear train assembly 118 further includes a support block 530 attached to an interior of the top wall 504 of the upper housing 502A. The second end 528B of the input shaft 526 is rotatably attached to the support block 530. In this way, the support block 530 prevents wobbling of the input shaft 526 as the input shaft 526 is rotated by the crank handle 116.

The gear train assembly 118 includes an input gear 532 (may also be referred to as a driving gear) having a first pitch circle. The input gear 532 is fixedly attached (e.g., non-rotatably attached) to the input shaft 526 (e.g., by a pin) about axis B (may also be referred to as a second axis). The gear train assembly 118 further includes an output gear 534 (may also be referred to as a driven gear) having a second pitch circle fixedly (non-rotatably attached) to an output shaft 536 about axis A. The output gear 534 (e.g., bevel gear) is mechanically coupled to the input gear 532 (e.g., bevel gear), such that the output gear 534 and input gear 532 are perpendicular to one another. However, in other embodiments, the output gear 534 and input gear 532 are parallel to one another, and may be planar or planar offset from one another. The second pitch circle of the output gear 534 is different from the first pitch circle of the input gear 532. In this way, the gear train assembly 118 provides a gear ratio. In certain embodiments, the gear ratio is 10:1, 5:1, 2:1, and preferably 4:1.

The output shaft 536 includes a first end 538A and a second end 538B (opposite the first end 538A). The gear train assembly 118 further includes a top bearing 540A, a bottom bearing 540B, and a grease seal 541. The first end 538A of the output shaft 536 is positioned within the top bearing 540A, and the first end 538A and the top bearing 540A are at least partially positioned in the center recess 512. In this way, the output shaft 536 rotates relative to the upper housing 502A of the gearbox housing 212. At least a portion of the output shaft 536 is positioned within the bottom bearing 540B, and at least a portion of the output shaft 536 and the bottom bearing 540B is positioned within the center through hole 514. In this way, the output shaft 536 rotates relative to the lower housing 502B of the gearbox housing 212. At least a portion of the output shaft 536 is positioned within the grease seal 541, and at least a portion of the output shaft 536 and the grease seal 541 is positioned within the center recess 516. The grease seal 541 provides a seal between the interior 503 of the gearbox housing 212 and the elongate housing body 114. The second end 538B of the output shaft 536 is fixedly (e.g., non-rotatably) attached to the collar 500 of the driving shaft 214.

Referring to FIG. 5D, rotation of the crank handle 116 about axis B rotates the input shaft 526 about axis B, which rotates the input gear 532 about axis B (which is perpendicular to axis A), which rotates the output gear 534 about axis A, which rotates the output shaft 536 about axis A, which rotates the driving shaft 214 about axis A. In other words, the gear train assembly 118 mechanically couples the crank handle 116 to the driving shaft 214 and provides a gear ratio reduction (e.g., 4:1) therebetween to maximize the output torque.

Figure 6A:
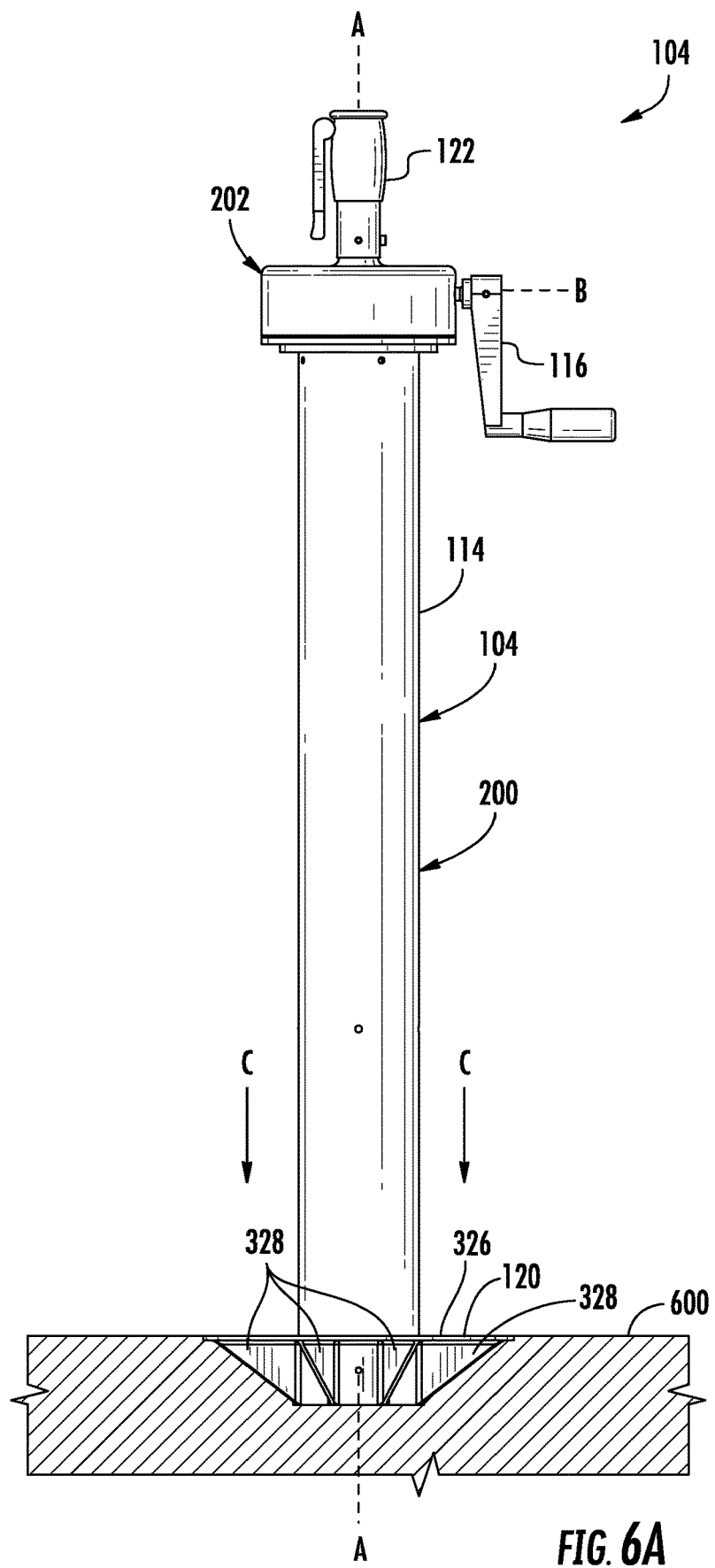
FIG. 6A is a side view of the anchoring umbrella stand of FIGS. 2A-2C positioned on a ground with the drill bit in the retracted position.
Figure 6B:
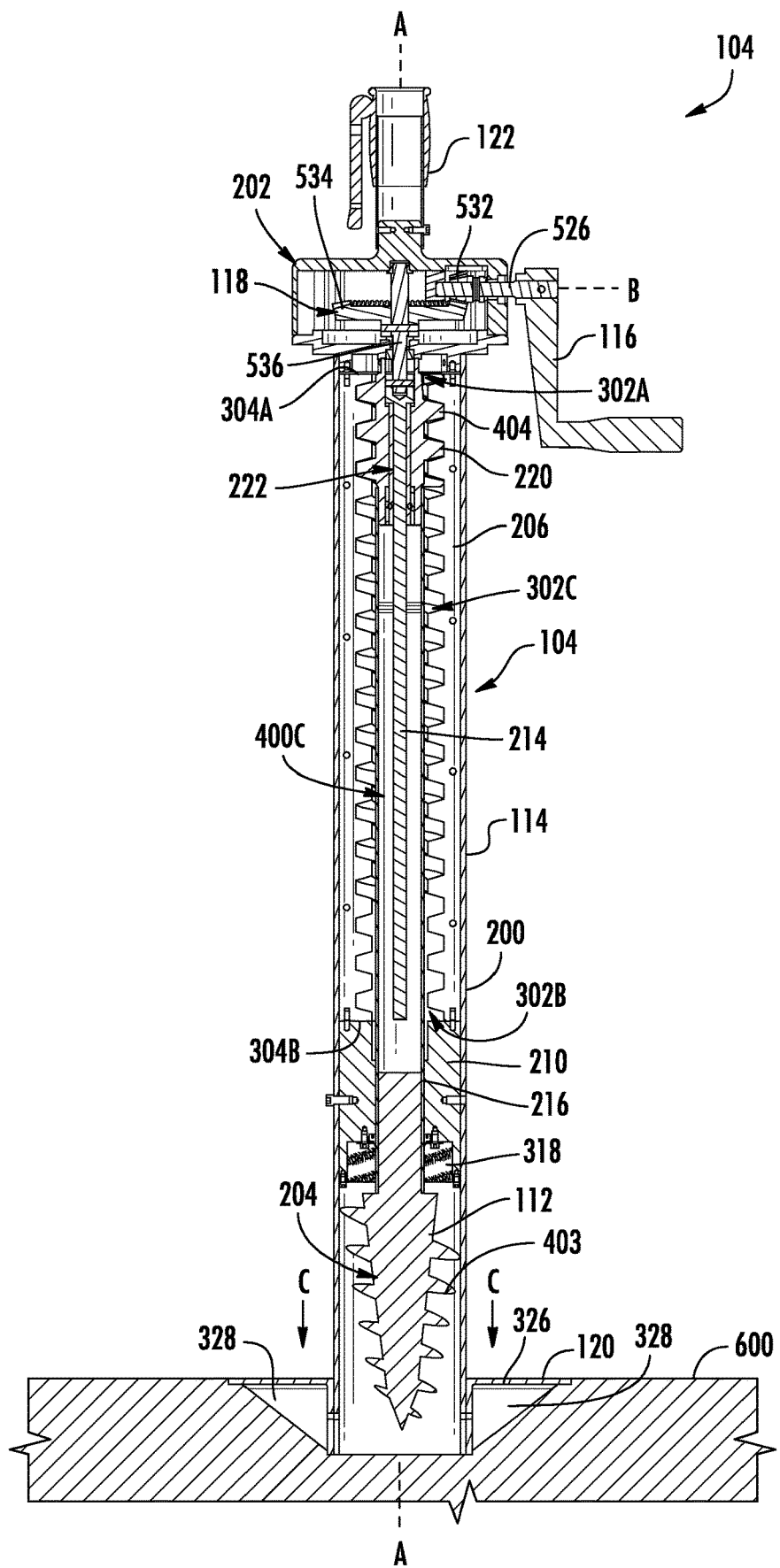
FIG. 6B is a cross-sectional side view of the anchoring umbrella stand of FIG. 6A with the drill bit in the retracted position.

FIGS. 6A-6E are views illustrating operation of the anchoring umbrella stand 104. In particular, FIGS. 6A and 6B are views of the anchoring umbrella stand 104 of FIGS. 2A-2C positioned on a ground 600 with the drill bit 112 in the retracted position. In particular, FIG. 6A is a side view of the anchoring umbrella stand 104 of FIGS. 2A-2C positioned on a ground with the drill bit 112 in the retracted position, and FIG. 6B is a cross-sectional side view of the anchoring umbrella stand 104 of FIG. 6A with the drill bit 112 in the retracted position. To anchor the anchoring umbrella stand 104, the anchoring umbrella stand 104 is oriented vertically, such that axis B is generally parallel to the ground 600 and axis A is generally perpendicular to the ground 600. A user then stands on the stabilizing plate 120 (illustrated by lines C), which at least partially pushes the ribs 328 of the stabilizing plate 120 into the ground 600.

Referring to FIG. 6B, the drill bit 112 is in the retracted position such that the threaded lead screw 220 is positioned within the threaded sleeve 206 towards a top end 124A of the elongate housing body 114. The hollow drill shaft 216 of the drill assembly 204 extends through the bearing assembly 210 and the drill bit 112 of the drill assembly 204 is positioned within the elongate housing body 114 such that the drill bit 112 does not extend past the bottom end 124B of the elongate housing body 114. In other words, the drill bit 112 is positioned entirely within the interior 124C of the elongate housing body 114.

The driving shaft 214 extends through the top opening 302A of the threaded sleeve 206 through at least a portion of the interior 302C of the threaded sleeve 206 toward (e.g., proximate) the bottom end 304B of the threaded sleeve 206. Further, the driving shaft 214 extends through the channel 222 of the threaded lead screw 220 into at least a portion of the channel 400C of the hollow drill shaft 216.

Figure 6C:
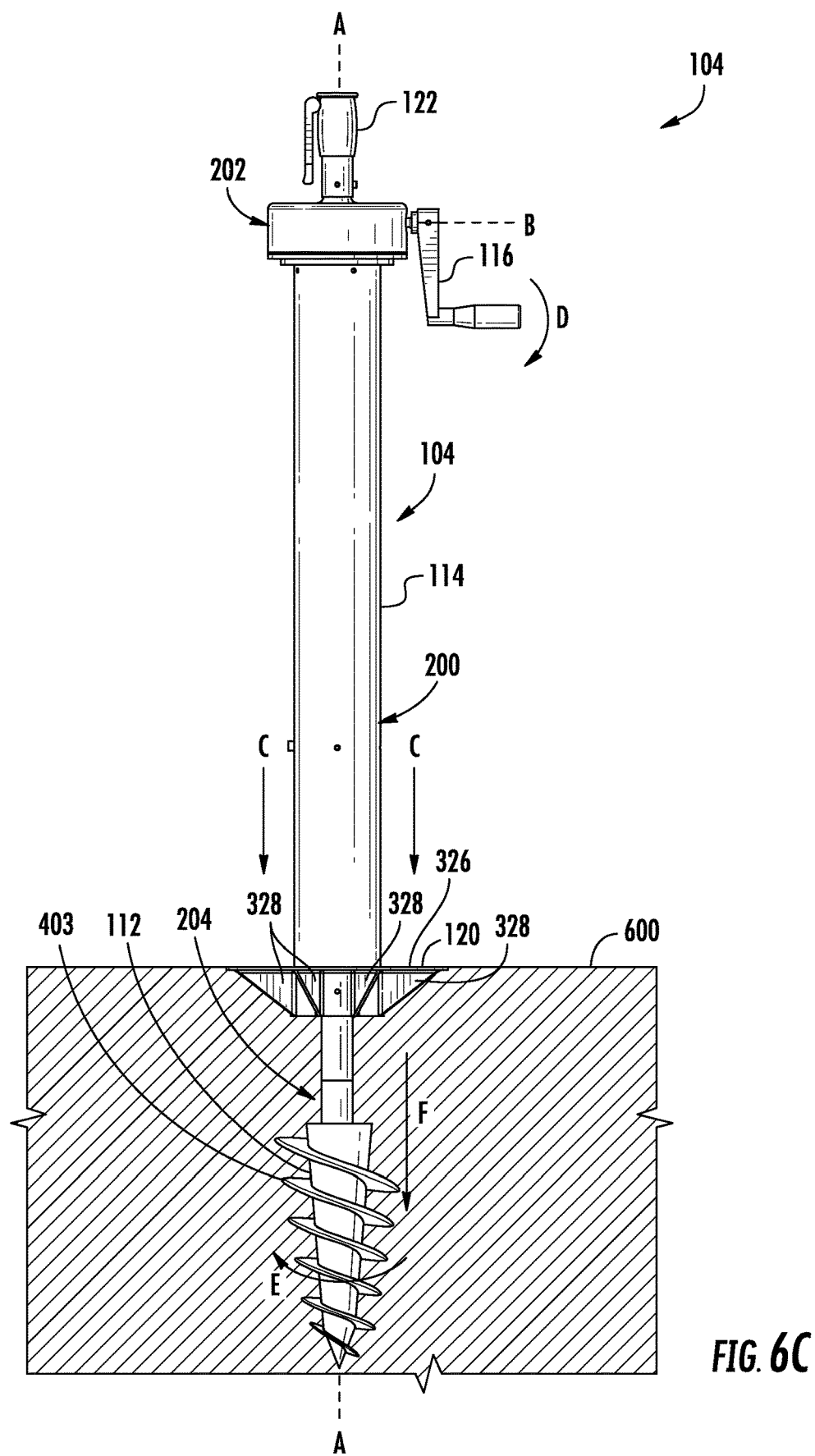
FIG. 6C is a side view of the anchoring umbrella stand of FIG. 6A with the drill bit in the extended position into the ground.
Figure 6D:
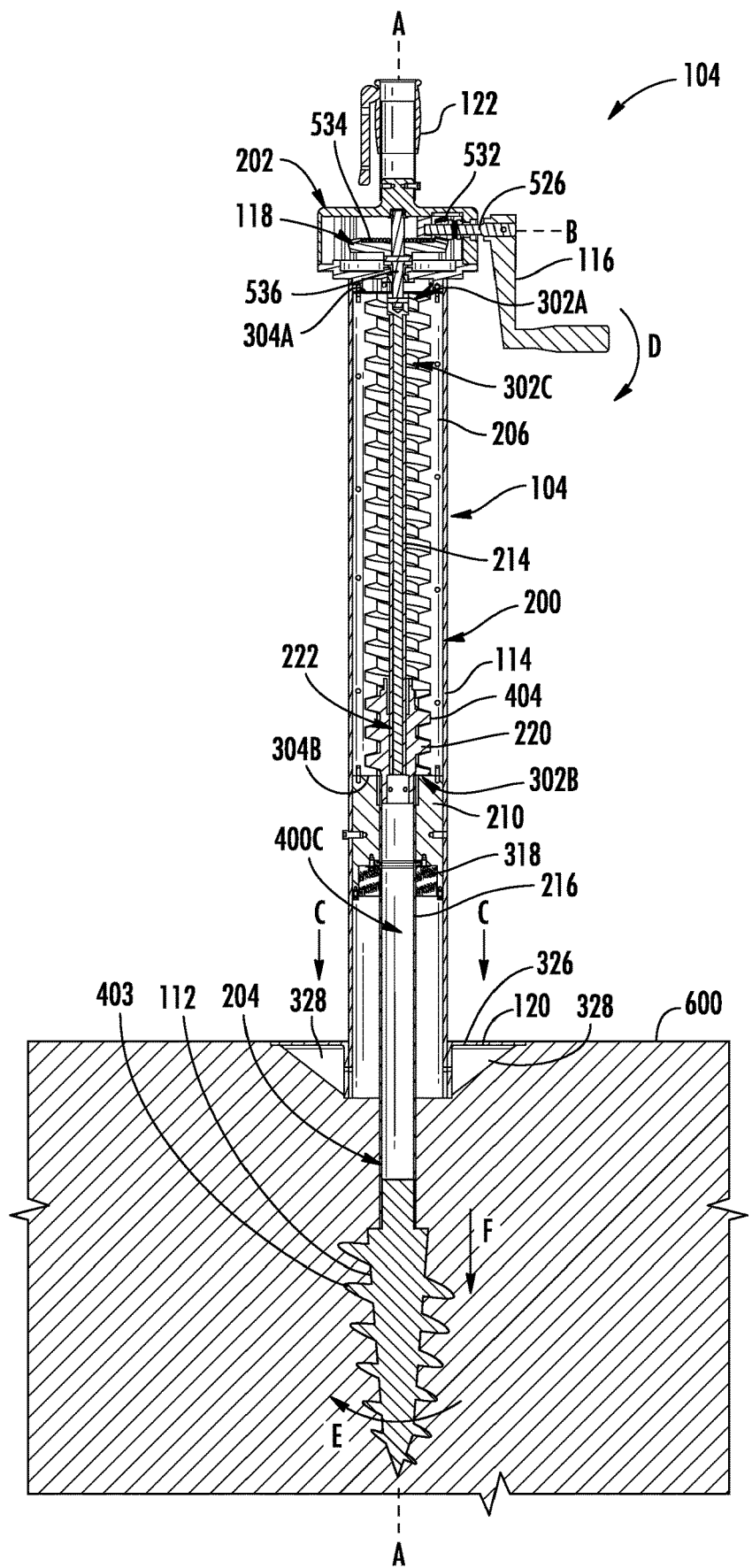
FIG. 6D is a cross-sectional side view of the anchoring umbrella stand of FIG. 6A with the drill bit in the extended position into the ground.

FIGS. 6C and 6D are views of the anchoring umbrella stand 104 with the drill bit 112 in the extended position. In particular, FIG. 6C is a side view of the anchoring umbrella stand 104 of FIG. 6A with the drill bit 112 in the extended position into the ground, and FIG. 6D is a cross-sectional side view of the anchoring umbrella stand 104 of FIG. 6A with the drill bit 112 in the extended position into the ground. While the user continues to stand on the stabilizing plate 120, the user rotates the crank handle 116 around axis B in a first direction. As axis B is parallel to the ground 600, the user is better able to balance themselves while operating the crank handle 116 compared to if the crank handle was oriented around axis A, for example. However, it is noted that the crank handle 116 could be configured to rotate around axis A instead. For example, the crank handle 116 could be positioned between the umbrella mount 122 and the gearbox housing 212.

Rotation by the user of the crank handle 116 (illustrated by line D) thereby rotates the input shaft 526 and input gear 532. The input gear 532 is mechanically coupled to the output gear 534 such that rotation of the input gear 532 rotates the output gear 534 with a gear reduction. Rotation of the output gear 534 rotates the output shaft 536 which rotates the driving shaft 214. As noted above, the cross-section of the driving shaft 214 is non-circular and corresponds to the cross-section of the channel 222. Rotation of the driving shaft 214 rotates the lead screw 220 such that the driving shaft 214 does not rotate relative to the lead screw 220. In this way, rotation of the driving shaft 214 also rotates the threaded lead screw 220. The threaded lead screw 220 is positioned within the interior 302C of the threaded sleeve 206, and the external threads 404 of the threaded lead screw 220 interact with the internal threads 306 of the threaded sleeve 206. Accordingly, as the threaded lead screw 220 rotates, it also translates toward the bottom end 304B of the threaded sleeve 206 (e.g., until the threaded lead screw 220 contacts the bearing assembly 210). As the cross-section of the driving shaft 214 corresponds to the cross-section of the channel 222, the threaded lead screw 220 translates relative to the driving shaft 214 as well.

Rotation and translation of the threaded lead screw 220 thereby rotates and translates the hollow drill shaft 216 through the bearing assembly 210 and also translates relative to the driving shaft 214. Further, rotation and translation of the threaded lead screw 220 rotates and translates the hollow drill shaft 216 and the drill bit 112 out of the bottom opening 300B of the elongate housing body 114. In particular, rotation of the drill bit 112 is illustrated by line E, and translation of the drill bit 112 is illustrated by line F). Rotation and translation of the drill bit 112 thereby facilitates penetration of the drill bit 112 into the ground 600 and anchoring of the anchoring umbrella stand 104 into the ground 600.

As the drill bit 112 translates into the ground 600, the counter force urges the elongate housing body 114 upward and away from the ground 600. However, this is countered by the user's own weight downward (illustrated by lines C) on the stabilizing plate 120. Further, as the drill bit 112 rotates in contact with the ground 600, the counter force urges the elongate housing body 114 to rotate in the reverse direction relative to the ground 600. However, this is countered by the ribs 328 of the stabilizing plate 120 which are at least partially penetrated into the ground 600. In other words, the ribs 328 rotationally fix the anchoring umbrella stand 104 relative to the ground 600.

Accordingly, rotation of the crank handle 116 rotates and translates the drill bit 112. In certain embodiments, every revolution of the crank handle 116 translates the drill bit 112 about 1 inch (e.g., to a maximum of 14 inches). Of course other ratios could be used, and depend upon the gear ratio of the gear train assembly 118 and the pitch of the external threads 404 of the threaded lead screw 220 and the internal threads 306 of the threaded sleeve 206. It is also noted that rotation of the crank handle 116 around axis B in a second direction (opposite the first direction) rotates and translates the drill bit into the elongate housing body 114. As the drill assembly 204 translates into the elongate housing body 114, the brushing seal 318 removes material (e.g., sand) from the hollow drill shaft 216, and the lip seal 316 prevents any such material which may not have been brushed off by the brushing seal 318 moving into the bearing assembly 210 and/or the threaded sleeve 206. Thus, the brushing seal 318 and the lip seal 316 prevent any material from moving into the bearing assembly 210 and/or threaded sleeve 206, when moving the drill assembly 204 to the retracted position.

Figure 6E:
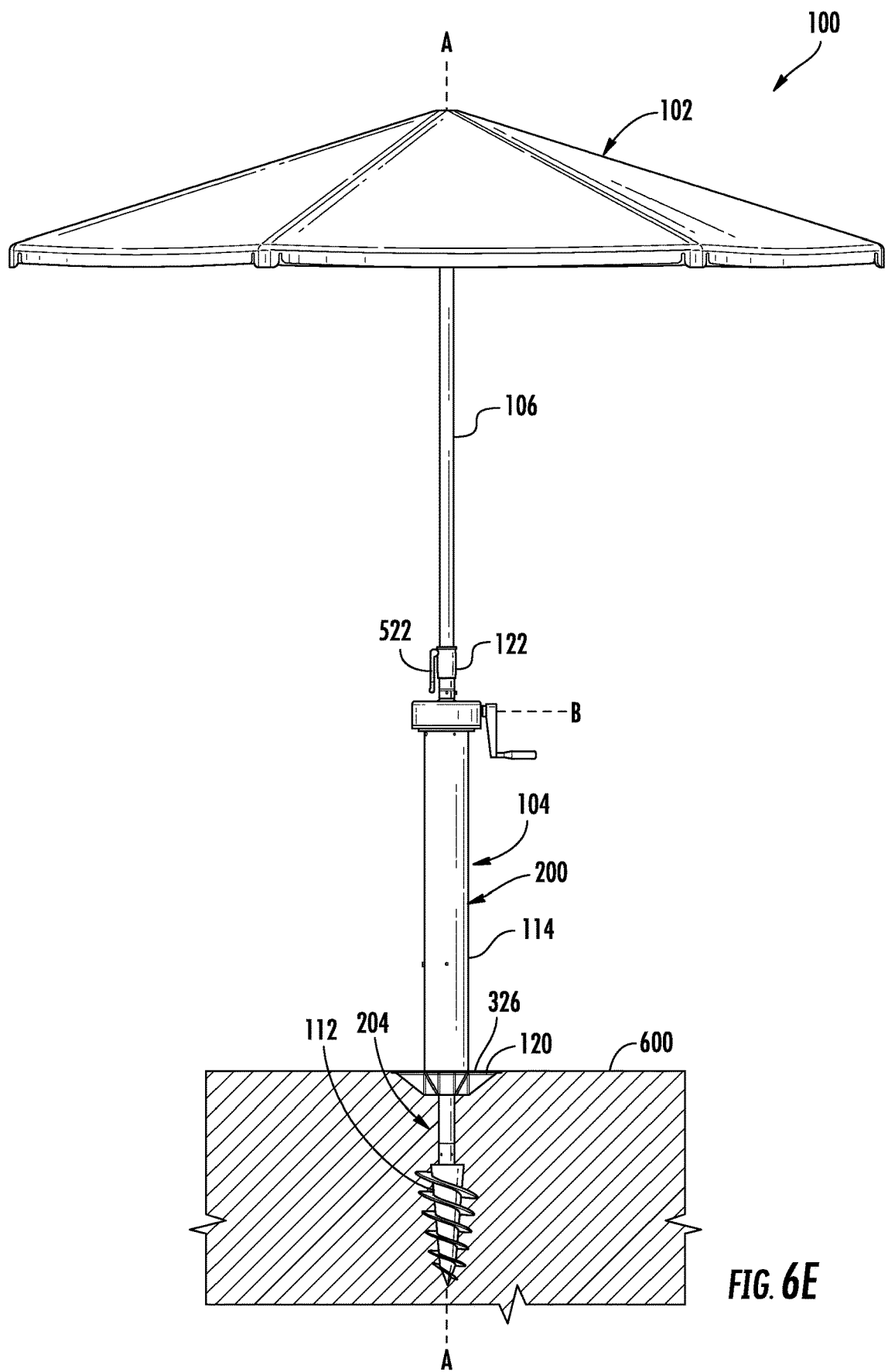
FIG. 6E is a side view of the anchoring umbrella stand of FIG. 6A with the drill bit in the extended position into the ground and an umbrella attached to the umbrella mount of the anchoring umbrella stand.

FIG. 6E is a side view of the anchoring umbrella stand 104 with the drill bit 112 in the extended position and an umbrella 102 attached to the umbrella mount 122 of the anchoring umbrella stand 104. Once the drill bit 112 is extended/penetrated into the ground 600 and the anchoring umbrella stand 104 is anchored in the ground 600, the pole 106 of the umbrella 102 is inserted into the umbrella mount 122 and selectively locked therein.

Thus, the anchoring umbrella stand 104 facilitates anchoring of an umbrella 102 into the ground 600, such as by providing a manually operated drill assembly 204 that rotates and translates, a gear reduction so that it is easier to penetrate the ground 600, and/or a stabilizing plate 120 for greater stability (e.g., during the anchoring process, after the anchoring process, etc.).

Figure 7:
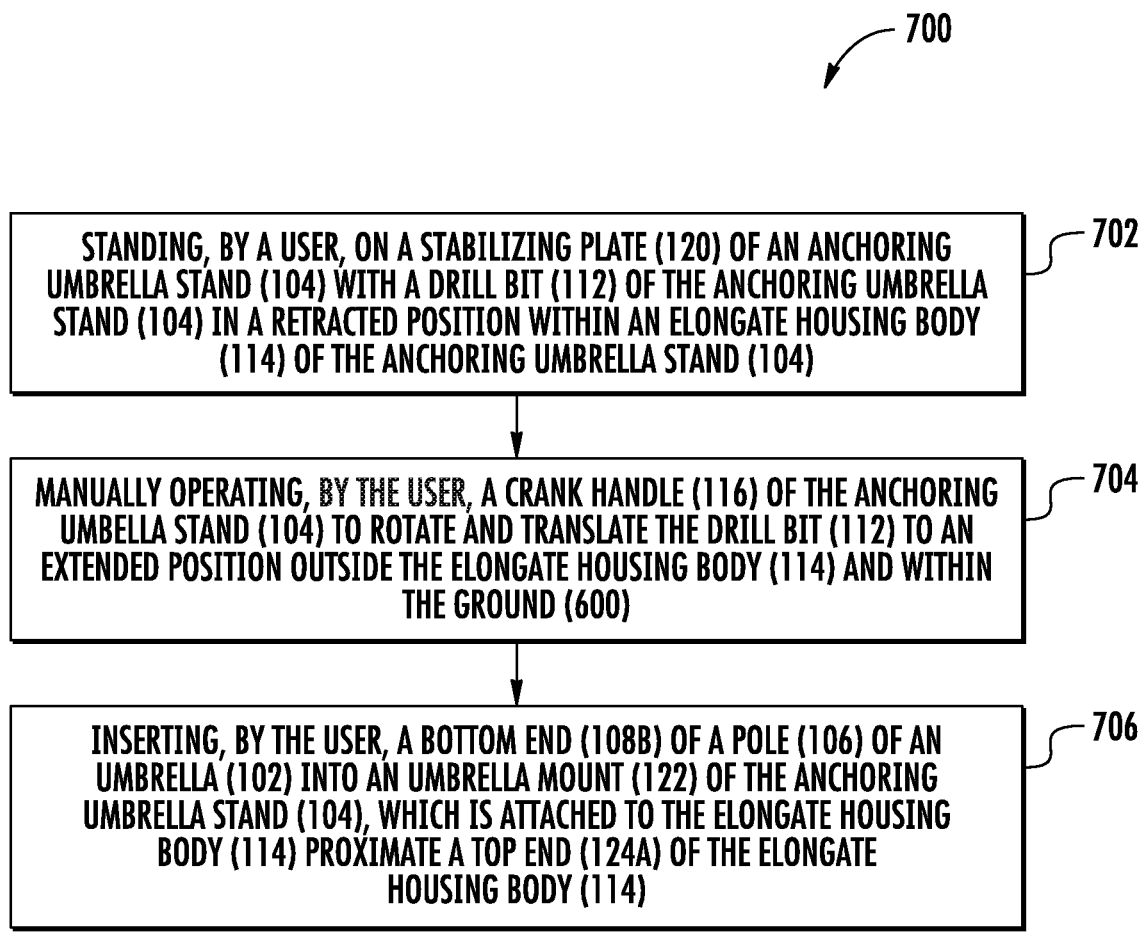
FIG. 7 is a flowchart illustrating steps for anchoring an umbrella using the anchoring umbrella stand of FIGS. 2A-2C.

FIG. 7 is a flowchart illustrating steps 700 for anchoring an umbrella 102 using the anchoring umbrella stand 104 of FIGS. 2A-2C. In step 702, a user stands on a stabilizing plate 120 of an anchoring umbrella stand 104 with a drill bit 112 of the anchoring umbrella stand 104 in a retracted position within an elongate housing body 114 of the anchoring umbrella stand 104. In step 704, the user manually operates a crank handle 116 of the anchoring umbrella stand 104 to rotate and translate the drill bit 112 to an extended position outside the elongate housing body 114 and within the ground 600. In step 706, the user inserts a bottom end 108B of a pole 106 of an umbrella 102 into an umbrella mount 122 of the anchoring umbrella stand 104, which is attached to the elongate housing body 114 proximate a top end 124A of the elongate housing body 114.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An anchoring umbrella stand, comprising:
    an elongate housing body;
    an umbrella mount attached to the elongate housing body proximate a top end of the elongate housing body;
    a crank handle attached to the elongate housing body proximate the top end of the elongate housing body, the crank handle rotatable relative to the elongate housing body; and
    a drill bit mechanically coupled to the crank handle and translatable relative to the elongate housing body between a retracted position within the elongate housing body to an extended position outside the elongate housing body proximate a bottom of the elongate housing body;
    wherein manual operation of the crank handle rotates and translates the drill bit between the retracted position and the extended position.

2. An umbrella assembly, comprising:
    the anchoring umbrella stand of claim 1; and
    an umbrella comprising:
        a pole having a top end and a bottom end; and
        a canopy attached at the top end of the pole;
    wherein the bottom end of the pole is removably attachable to the umbrella mount of the anchoring umbrella stand.

3. The anchoring umbrella stand of claim 1, wherein the elongate housing body extends along a first axis, an axis of rotation of the crank handle being perpendicular to the first axis of the elongate housing body.

4. The anchoring umbrella stand of claim 1, further comprising a gearbox assembly comprising a gearbox housing and the crank handle rotatably attached to a side of the gearbox housing, the umbrella mount attached to a top of the gearbox housing, the gearbox housing attached to the top end of the elongate housing body.

5. The anchoring umbrella stand of claim 4, wherein the gearbox assembly further comprises a gear train assembly at least partially positioned within the gearbox housing, the gear train assembly comprising an input shaft attached to the crank handle, an input gear attached to the input shaft, an output gear mechanically coupled to the input gear, and an output shaft attached to the output gear.

6. The anchoring umbrella stand of claim 5, wherein the gear ratio between the input gear and the output gear is 4:1.

7. The anchoring umbrella stand of claim 5,
    wherein the gearbox assembly further comprises a driving shaft attached to the output shaft; and
    wherein rotation of the crank handle rotates the driving shaft via the gear train assembly.

8. The anchoring umbrella stand of claim 7, wherein the driving shaft comprises a non-circular cross-section.

9. The anchoring umbrella stand of claim 1, wherein the drill bit comprises an auger.

10. The anchoring umbrella stand of claim 1, further comprising a drill assembly comprising:
    a hollow drill shaft with a top end and a bottom end;
    a threaded lead screw attached to the top end of the hollow drill shaft; and
    the drill bit attached to the bottom end of the hollow drill shaft.

11. The anchoring umbrella stand of claim 10, wherein the threaded lead screw defines a channel with a non-circular cross-section.

12. The anchoring umbrella stand of claim 11, further comprising a driving shaft comprising a non-circular cross-section and mechanically coupled via a gear train assembly to the crank handle, at least a portion of the driving shaft positioned within the channel of the threaded lead screw positioned within the elongate housing body.

13. The anchoring umbrella stand of claim 12, wherein rotation of the driving shaft rotates the lead screw such that the driving shaft does not rotate relative to the lead screw.

14. The anchoring umbrella stand of claim 1, further comprising a housing assembly comprising:
    the elongate housing body; and
    a threaded sleeve positioned within the elongate housing body.

15. The anchoring umbrella stand of claim 14, further comprising a drill assembly comprising:
    a hollow drill shaft with a top end and a bottom end;

a threaded lead screw attached to the top end of the hollow drill shaft and positioned within the threaded sleeve; and the drill bit attached to the bottom end of the hollow drill shaft;

wherein rotation of the lead screw translates the lead screw relative to the threaded sleeve.

16. The anchoring umbrella stand of claim 14, wherein the housing assembly further comprises a bearing assembly positioned within the elongate housing body.

17. The anchoring umbrella stand of claim 16, further comprising a drill assembly comprising:
a hollow drill shaft with a top end and a bottom end, at least a portion of the hollow drill shaft of the drill assembly positioned within and extending through the bearing assembly;
a threaded lead screw attached to the top end of the hollow drill shaft and positioned within the threaded sleeve; and
the drill bit attached to the bottom end of the hollow drill shaft.

18. The anchoring umbrella stand of claim 17, wherein the bearing assembly comprises a brushing seal.

19. The anchoring umbrella stand of claim 1, further comprising a housing assembly comprising:
the elongate housing body; and
a stabilizing plate attached to the elongate housing body proximate the bottom of the elongate housing body.

20. The anchoring umbrella stand of claim 19, wherein the stabilizing plate comprises a plurality of ribs radially extending at a bottom surface of the stabilizing plate.

21. An anchoring umbrella stand, comprising:
a housing assembly comprising:
an elongate housing body extending along a first axis;
a threaded sleeve positioned within the elongate housing body;
a bearing assembly positioned within the elongate housing body; and
a stabilizing plate attached to the elongate housing body proximate a bottom of the elongate housing body, the stabilizing plate comprising a plurality of ribs radially extending at a bottom surface of the stabilizing plate;
a gearbox assembly attached to a top end of the elongate housing body, the gearbox assembly comprising:
a gearbox housing;
an umbrella mount attached to a top of the gearbox housing;
a crank handle rotatably attached to the gearbox housing, an axis of rotation of the crank handle being perpendicular to the first axis of the elongate housing body, the crank handle rotatable relative to the elongate housing body;
a gear train assembly at least partially positioned within the gearbox housing, the gear train assembly comprising an input shaft attached to the crank handle, an input gear attached to the input shaft, an output gear mechanically coupled to the input gear, and an output shaft attached to the output gear; and
a driving shaft attached to the output shaft, the driving shaft comprises a non-circular cross-section; and
a drill assembly mechanically coupled to the gearbox assembly and at least partially positioned within the elongate housing body, the drill assembly comprising:
a hollow drill shaft with a top end and a bottom end, at least a portion of the hollow drill shaft of the drill assembly positioned within and extending through the bearing assembly;
a threaded lead screw attached to the top end of the hollow drill shaft and positioned within the elongate housing body, the threaded lead screw mechanically coupled to the threaded sleeve of the housing assembly, the threaded lead screw defining a channel with a non-circular cross-section, at least a portion of the driving shaft positioned within the channel of the threaded lead screw; and
a drill bit attached to the bottom end of the hollow drill shaft, the drill bit mechanically coupled to the crank handle and translatable relative to the elongate housing body between a retracted position within the elongate housing body to an extended position outside the elongate housing body proximate the bottom of the elongate housing body;
wherein manual operation of the crank handle rotates the driving shaft via the gear train assembly, which rotates and translates the threaded lead screw relative to the threaded sleeve, which rotates and translates the drill bit between the retracted position and the extended position.

22. An umbrella assembly, comprising:
the anchoring umbrella stand of claim 21; and
an umbrella comprising:
a pole having a top end and a bottom end; and
a canopy attached at the top end of the pole;
wherein the bottom end of the pole is removably attachable to the umbrella mount of the anchoring umbrella stand.

23. A method of anchoring an umbrella, comprising:
standing on a stabilizing plate of an anchoring umbrella stand while a drill bit of the anchoring umbrella stand is in a retracted position within an elongate housing body of the anchoring umbrella stand; and
manually operating a crank handle of the anchoring umbrella stand to rotate and translate the drill bit to an extended position outside the elongate housing body and within a ground.

24. The method of claim 23, further comprising inserting a bottom end of a pole of an umbrella into an umbrella mount of the anchoring umbrella stand, the umbrella mount attached to the elongate housing body proximate a top end of the elongate housing body.

* * * * *